US008966542B2

(12) United States Patent
Howe et al.

(10) Patent No.: US 8,966,542 B2
(45) Date of Patent: *Feb. 24, 2015

(54) SYSTEM AND METHOD FOR PROVIDING MEDIA CONTENT AND INTERACTIVE CONTENT

(71) Applicant: AT&T Intellectual Property I, L.P., Atlanta, GA (US)

(72) Inventors: Wayne R. Howe, Dublin, OH (US); Fred Thomas Danner, III, Alpharetta, GA (US); John R. Mauney, Jefferson, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,425

(22) Filed: Jun. 17, 2013

(65) Prior Publication Data
US 2013/0283320 A1 Oct. 24, 2013

Related U.S. Application Data

(60) Continuation of application No. 10/335,735, filed on Jan. 2, 2003, now Pat. No. 8,490,145, which is a division of application No. 09/116,325, filed on Jul. 15, 1998, now Pat. No. 6,567,982, which is a continuation of application No. 08/428,718, filed on Apr. 25, 1995, now Pat. No. 5,818,438.

(51) Int. Cl.
G06F 3/00 (2006.01)
G06F 13/00 (2006.01)
(Continued)

(52) U.S. Cl.
CPC ......... H04N 21/8166 (2013.01); H04N 21/472 (2013.01); H04N 5/44 (2013.01);
(Continued)

(58) Field of Classification Search
CPC .............. H04N 21/482; H04N 21/472; H04N 21/8166; H04N 7/165; H04N 7/17318; H04N 7/177336; H04N 21/235; H04N 21/25808; H04N 21/435; H04N 21/4383; H04N 21/4384; H04N 21/44222; H04N 21/47202
USPC ............. 725/20, 40, 51, 52, 60, 61, 109, 120, 725/136; 348/563, 564; 705/14.55
See application file for complete search history.

(56) References Cited

U.S. PATENT DOCUMENTS 3,798,610 A 3/1974 Bliss et al.
3,886,302 A 5/1975 Kosco
(Continued)

FOREIGN PATENT DOCUMENTS

EP 1117257 A2 7/2001
WO 9414284 A1 6/1994
(Continued)

OTHER PUBLICATIONS

US 5,787,683, 08/1998, Sistanizadeh et al. (withdrawn).
(Continued)

Primary Examiner — Hoang-Vu A Nguyen-Ba
(74) Attorney, Agent, or Firm — Toler Law Group, PC

(57) ABSTRACT

A method includes receiving an indicator from a service provider via a network. The indicator is received with first media content and includes data to cause a selectable image to be displayed with the first media content. The selectable image indicates an availability of second media content that is different than the first media content. The method includes, in response to receipt of the indicator, displaying the selectable image with the first media content at a display device. The method further includes, in response to receiving a removal message before receiving an input indicating a selection of the selectable image, removing the selectable image from display at the display device.

20 Claims, 16 Drawing Sheets

(51) Int. Cl.
*H04N 5/445* (2011.01)
*G06Q 30/00* (2012.01)
*H04N 21/81* (2011.01)
*H04N 21/472* (2011.01)
*H04N 21/235* (2011.01)
*H04N 21/258* (2011.01)
*H04N 21/435* (2011.01)
*H04N 21/438* (2011.01)
*H04N 21/442* (2011.01)
*H04N 21/4722* (2011.01)
*H04N 21/488* (2011.01)
*H04N 21/658* (2011.01)
*H04N 21/858* (2011.01)
*H04N 21/482* (2011.01)
*H04N 21/6547* (2011.01)
*H04N 7/16* (2011.01)
*H04N 7/173* (2011.01)
*H04N 5/44* (2011.01)
*H04N 5/50* (2006.01)

(52) U.S. Cl.
CPC ............. *H04N 5/50* (2013.01); *H04N 7/165* (2013.01); *H04N 7/17318* (2013.01); *H04N 7/17336* (2013.01); *H04N 21/235* (2013.01); *H04N 21/25808* (2013.01); *H04N 21/435* (2013.01); *H04N 21/4383* (2013.01); *H04N 21/4384* (2013.01); *H04N 21/44222* (2013.01); *H04N 21/47202* (2013.01); *H04N 21/4722* (2013.01); *H04N 21/4882* (2013.01); *H04N 21/6582* (2013.01); *H04N 21/8133* (2013.01); *H04N 21/8586* (2013.01); *H04N 21/482* (2013.01); *H04N 21/6547* (2013.01)
USPC ............... 725/61; 725/20; 725/40; 725/51; 725/52; 725/60; 725/109; 725/120; 725/136; 348/563; 348/564; 705/14.55

(56) References Cited

U.S. PATENT DOCUMENTS

| | | |
|---|---|---|
| 4,130,833 A | 12/1978 | Chomet |
| 4,258,386 A | 3/1981 | Cheung |
| 4,264,925 A | 4/1981 | Freeman et al. |
| 4,361,851 A | 11/1982 | Asip et al. |
| 4,476,488 A | 10/1984 | Merrell |
| 4,488,179 A | 12/1984 | Krüger et al. |
| 4,536,791 A | 8/1985 | Campbell et al. |
| 4,566,030 A | 1/1986 | Nickerson et al. |
| 4,567,591 A | 1/1986 | Gray et al. |
| 4,573,072 A | 2/1986 | Freeman |
| 4,598,288 A | 7/1986 | Yarbrough et al. |
| 4,688,248 A | 8/1987 | Tomizawa |
| 4,689,661 A | 8/1987 | Barbieri et al. |
| 4,698,670 A | 10/1987 | Matty |
| 4,720,873 A | 1/1988 | Goodman et al. |
| 4,816,904 A | 3/1989 | McKenna et al. |
| 4,862,268 A | 8/1989 | Campbell et al. |
| 4,890,322 A | 12/1989 | Russell, Jr. |
| 4,890,332 A | 12/1989 | Takahashi |
| 4,912,552 A | 3/1990 | Allison, III et al. |
| 4,939,509 A | 7/1990 | Bartholomew et al. |
| 4,977,455 A | 12/1990 | Young |
| 5,010,585 A | 4/1991 | Garcia |
| 5,010,858 A | 4/1991 | Schierling et al. |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,161,019 A | 11/1992 | Emanuel |
| 5,173,900 A | 12/1992 | Miller et al. |
| 5,181,438 A | 1/1993 | Wellman |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | Von Kohorn |
| 5,260,778 A | 11/1993 | Kauffman et al. |
| 5,262,860 A | 11/1993 | Fitzpatrick et al. |
| 5,287,181 A | 2/1994 | Holman |
| 5,305,195 A | 4/1994 | Murphy |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,390,027 A | 2/1995 | Henmi et al. |
| 5,404,393 A | 4/1995 | Remillard |
| 5,444,499 A | 8/1995 | Saitoh |
| 5,446,490 A | 8/1995 | Blahut et al. |
| 5,446,919 A | 8/1995 | Wilkins |
| 5,448,568 A | 9/1995 | Delpuch et al. |
| 5,481,542 A | 1/1996 | Logston et al. |
| 5,483,277 A | 1/1996 | Granger |
| 5,502,499 A | 3/1996 | Birch et al. |
| 5,539,451 A | 7/1996 | Carey et al. |
| 5,539,822 A * | 7/1996 | Lett .............................. 380/211 |
| 5,541,662 A | 7/1996 | Adams et al. |
| 5,541,917 A | 7/1996 | Farris |
| 5,555,838 A | 9/1996 | Bergman |
| 5,557,320 A | 9/1996 | Krebs |
| 5,557,338 A | 9/1996 | Maze et al. |
| 5,564,073 A | 10/1996 | Takahisa |
| 5,585,838 A | 12/1996 | Lawler et al. |
| 5,585,858 A | 12/1996 | Harper et al. |
| 5,592,477 A | 1/1997 | Farris et al. |
| 5,592,551 A | 1/1997 | Lett et al. |
| 5,600,775 A | 2/1997 | King et al. |
| 5,608,448 A | 3/1997 | Smoral et al. |
| 5,629,733 A | 5/1997 | Youman et al. |
| 5,640,192 A | 6/1997 | Garfinkle |
| 5,648,824 A | 7/1997 | Dunn et al. |
| 5,661,517 A | 8/1997 | Budow et al. |
| 5,721,829 A | 2/1998 | Dunn et al. |
| 5,732,219 A | 3/1998 | Blumer et al. |
| 5,774,664 A | 6/1998 | Hidary et al. |
| 5,779,549 A | 7/1998 | Walker et al. |
| 5,781,246 A | 7/1998 | Alten et al. |
| 5,784,683 A | 7/1998 | Sistanizadeh et al. |
| 5,796,426 A | 8/1998 | Gullichsen et al. |
| 5,797,001 A | 8/1998 | Augenbraun et al. |
| 5,805,154 A | 9/1998 | Brown |
| 5,818,438 A | 10/1998 | Howe et al. |
| 5,820,459 A | 10/1998 | Acres et al. |
| 5,822,123 A | 10/1998 | Davis et al. |
| 5,828,420 A | 10/1998 | Marshall et al. |
| 5,847,771 A | 12/1998 | Cloutier et al. |
| 5,864,823 A | 1/1999 | Levitan |
| 5,867,205 A | 2/1999 | Harrison |
| 5,867,688 A | 2/1999 | Simmon et al. |
| 5,880,768 A | 3/1999 | Lemmons et al. |
| 5,880,769 A | 3/1999 | Nemirofsky et al. |
| 5,892,508 A | 4/1999 | Howe et al. |
| 5,929,931 A | 7/1999 | Hoekstra |
| 5,931,908 A | 8/1999 | Gerba et al. |
| 5,977,964 A | 11/1999 | Williams et al. |
| 5,990,927 A | 11/1999 | Hendricks et al. |
| 6,005,561 A | 12/1999 | Hawkins et al. |
| 6,008,802 A | 12/1999 | Iki et al. |
| 6,012,983 A | 1/2000 | Walker et al. |
| 6,018,764 A | 1/2000 | Field et al. |
| 6,025,837 A | 2/2000 | Matthews, III et al. |
| 6,100,883 A | 8/2000 | Hoarty |
| 6,108,042 A | 8/2000 | Adams et al. |
| 6,113,495 A | 9/2000 | Walker et al. |
| 6,144,402 A | 11/2000 | Norsworthy et al. |
| 6,157,413 A | 12/2000 | Hanafee et al. |
| 6,201,536 B1 | 3/2001 | Hendricks et al. |
| 6,213,880 B1 | 4/2001 | Sim |
| 6,230,172 B1 | 5/2001 | Purnaveja et al. |
| 6,240,555 B1 | 5/2001 | Shoff et al. |
| 6,244,957 B1 | 6/2001 | Walker et al. |

(56) References Cited

U.S. PATENT DOCUMENTS

| | | |
|---|---|---|
| 6,256,785 B1 | 7/2001 | Klappert et al. |
| 6,279,112 B1 | 8/2001 | O'Toole, Jr. et al. |
| 6,292,210 B1 | 9/2001 | Gerszberg et al. |
| 6,298,482 B1 | 10/2001 | Seidman et al. |
| 6,317,885 B1 | 11/2001 | Fries |
| 6,324,544 B1 | 11/2001 | Alam et al. |
| 6,324,694 B1 | 11/2001 | Watts et al. |
| 6,327,574 B1 | 12/2001 | Kramer et al. |
| 6,349,410 B1 | 2/2002 | Lortz |
| 6,357,042 B2 | 3/2002 | Srinivasan et al. |
| 6,363,525 B1 | 3/2002 | Dougherty et al. |
| 6,418,556 B1 | 7/2002 | Bennington et al. |
| 6,419,137 B1 | 7/2002 | Marshall et al. |
| 6,463,207 B1 | 10/2002 | Abecassis |
| 6,463,585 B1 | 10/2002 | Hendricks et al. |
| 6,463,858 B2 | 10/2002 | Weber et al. |
| 6,468,155 B1 | 10/2002 | Zucker et al. |
| 6,477,579 B1 | 11/2002 | Kunkel et al. |
| 6,483,986 B1 | 11/2002 | Krapf |
| 6,490,725 B2 | 12/2002 | Kikinis |
| 6,491,651 B1 | 12/2002 | Leahy et al. |
| 6,502,242 B1 | 12/2002 | Howe et al. |
| 6,505,169 B1 | 1/2003 | Bhagavath et al. |
| 6,535,889 B1 | 3/2003 | Headrick et al. |
| 6,557,006 B1 | 4/2003 | Headrick et al. |
| 6,564,246 B1 | 5/2003 | Varma et al. |
| 6,567,982 B1 | 5/2003 | Howe et al. |
| 6,571,392 B1 | 5/2003 | Zigmond et al. |
| 6,615,408 B1 | 9/2003 | Kaiser et al. |
| 6,634,942 B2 | 10/2003 | Walker et al. |
| 6,676,522 B2 | 1/2004 | Rowe et al. |
| 6,701,437 B1 | 3/2004 | Hoke et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,754,904 B1 | 6/2004 | Cooper et al. |
| 6,756,997 B1 | 6/2004 | Ward, III et al. |
| 6,760,916 B2 | 7/2004 | Holtz et al. |
| 6,800,029 B2 | 10/2004 | Rowe et al. |
| 6,820,277 B1 | 11/2004 | Eldering et al. |
| 6,826,775 B1 | 11/2004 | Howe et al. |
| 6,850,252 B1 | 2/2005 | Hoffberg |
| 6,886,178 B1 | 4/2005 | Mao et al. |
| 6,898,762 B2 | 5/2005 | Ellis et al. |
| 6,967,566 B2 | 11/2005 | Weston et al. |
| 7,100,183 B2 | 8/2006 | Kunkel et al. |
| 7,237,253 B1 | 6/2007 | Blackketter et al. |
| 7,249,321 B2 | 7/2007 | Bushey et al. |
| 7,266,832 B2 | 9/2007 | Miller |
| 7,266,835 B2 | 9/2007 | Halbert |
| 7,284,032 B2 | 10/2007 | Weber |
| 7,292,774 B1 | 11/2007 | Masters et al. |
| 7,293,276 B2 | 11/2007 | Phillips et al. |
| 7,302,696 B1 | 11/2007 | Yamamoto |
| 7,320,134 B1 | 1/2008 | Tomsen et al. |
| 7,337,457 B2 | 2/2008 | Pack et al. |
| 7,434,247 B2 | 10/2008 | Dudkiewicz et al. |
| 7,437,749 B1 | 10/2008 | Smith et al. |
| 7,444,659 B2 | 10/2008 | Lemmons |
| 7,634,787 B1 | 12/2009 | Gebhardt et al. |
| 7,849,226 B2 | 12/2010 | Zigmond et al. |
| 7,882,530 B2 | 2/2011 | Ducheneaut et al. |
| 8,166,498 B2 | 4/2012 | Walter |
| 8,282,476 B2 | 10/2012 | Walter |
| 8,317,618 B2 | 11/2012 | Malik |
| 8,365,218 B2 | 1/2013 | Walter et al. |
| 8,370,763 B1 | 2/2013 | Moore et al. |
| 8,418,196 B2 | 4/2013 | Gray et al. |
| 2001/0016943 A1 | 8/2001 | Maas et al. |
| 2001/0054134 A1 | 12/2001 | Nagatomo et al. |
| 2002/0056093 A1 | 5/2002 | Kunkel et al. |
| 2002/0056129 A1 | 5/2002 | Blackketter et al. |
| 2002/0059586 A1 | 5/2002 | Carney et al. |
| 2002/0059644 A1 | 5/2002 | Andrade et al. |
| 2002/0069132 A1 | 6/2002 | Perkes et al. |
| 2002/0083464 A1 | 6/2002 | Tomsen et al. |
| 2002/0083469 A1 | 6/2002 | Jeannin et al. |
| 2002/0087402 A1 | 7/2002 | Zustak et al. |
| 2002/0087988 A1 | 7/2002 | Lipscomb et al. |
| 2002/0124252 A1 | 9/2002 | Schaefer et al. |
| 2002/0132585 A1 | 9/2002 | Palermo et al. |
| 2002/0138561 A1 | 9/2002 | Chatfield et al. |
| 2002/0147984 A1 | 10/2002 | Tomsen et al. |
| 2002/0147988 A1 | 10/2002 | Nakano |
| 2002/0156870 A1 | 10/2002 | Boroumand et al. |
| 2002/0157099 A1 | 10/2002 | Schrader et al. |
| 2002/0162121 A1 | 10/2002 | Mitchell |
| 2002/0164155 A1 | 11/2002 | Mate |
| 2003/0005437 A1 | 1/2003 | Feuer et al. |
| 2003/0005448 A1 | 1/2003 | Axelsson et al. |
| 2003/0018969 A1 | 1/2003 | Humpleman et al. |
| 2003/0037332 A1 | 2/2003 | Chapin et al. |
| 2003/0051238 A1 | 3/2003 | Barone, Jr. |
| 2003/0067544 A1 | 4/2003 | Wada |
| 2003/0067554 A1 | 4/2003 | Klarfeld et al. |
| 2003/0070167 A1 | 4/2003 | Holtz et al. |
| 2003/0088872 A1 | 5/2003 | Maissel et al. |
| 2003/0088875 A1 | 5/2003 | Gay et al. |
| 2003/0093790 A1 | 5/2003 | Logan et al. |
| 2003/0110171 A1 | 6/2003 | Ozer et al. |
| 2003/0110499 A1 | 6/2003 | Knudson et al. |
| 2003/0111742 A1 | 6/2003 | Iwasaki et al. |
| 2003/0117445 A1 | 6/2003 | Hendricks et al. |
| 2003/0121051 A1 | 6/2003 | Howe et al. |
| 2003/0145323 A1 | 7/2003 | Hendricks et al. |
| 2003/0149975 A1 | 8/2003 | Eldering et al. |
| 2003/0159142 A1 | 8/2003 | Howe et al. |
| 2003/0163828 A1 | 8/2003 | Agnihotri et al. |
| 2003/0182567 A1 | 9/2003 | Barton et al. |
| 2003/0182663 A1 | 9/2003 | Gudorf et al. |
| 2003/0188317 A1 | 10/2003 | Liew et al. |
| 2003/0204847 A1 | 10/2003 | Ellis et al. |
| 2003/0208754 A1 | 11/2003 | Sridhar et al. |
| 2003/0233650 A1 | 12/2003 | Zaner et al. |
| 2003/0233656 A1 | 12/2003 | Sie et al. |
| 2003/0235407 A1 | 12/2003 | Lord |
| 2004/0003402 A1 | 1/2004 | McKenna, Jr. |
| 2004/0006509 A1 | 1/2004 | Mannik et al. |
| 2004/0012717 A1 | 1/2004 | Sprague et al. |
| 2004/0021403 A1 | 2/2004 | Ayazi et al. |
| 2004/0045028 A1 | 3/2004 | Harris |
| 2004/0049785 A1 | 3/2004 | Grzeczkowski et al. |
| 2004/0098754 A1 | 5/2004 | Vella et al. |
| 2004/0103032 A1 | 5/2004 | Maggio |
| 2004/0108776 A1 | 6/2004 | Horng et al. |
| 2004/0111741 A1 | 6/2004 | DePietro |
| 2004/0111742 A1 | 6/2004 | Hendricks et al. |
| 2004/0117819 A1 | 6/2004 | Yu |
| 2004/0122731 A1 | 6/2004 | Mannik et al. |
| 2004/0163101 A1 | 8/2004 | Swix et al. |
| 2004/0168188 A1 | 8/2004 | Bennington et al. |
| 2004/0194138 A1 | 9/2004 | Boylan, III et al. |
| 2004/0220858 A1 | 11/2004 | Maggio |
| 2004/0235567 A1 | 11/2004 | Chatani |
| 2004/0243470 A1 | 12/2004 | Ozer et al. |
| 2004/0243623 A1 | 12/2004 | Ozer et al. |
| 2004/0261127 A1 | 12/2004 | Freeman et al. |
| 2004/0268385 A1 | 12/2004 | Gray et al. |
| 2004/0268401 A1 | 12/2004 | Gray et al. |
| 2004/0268404 A1 | 12/2004 | Gray et al. |
| 2004/0268416 A1 | 12/2004 | Gray et al. |
| 2004/0268417 A1 | 12/2004 | Gray et al. |
| 2004/0268418 A1 | 12/2004 | Gray et al. |
| 2005/0005303 A1 | 1/2005 | Barone, Jr. et al. |
| 2005/0021403 A1 | 1/2005 | Ozer et al. |
| 2005/0086688 A1 | 4/2005 | Omoigui |
| 2005/0091111 A1 | 4/2005 | Green et al. |
| 2005/0097599 A1 | 5/2005 | Plotnick et al. |
| 2005/0108776 A1 | 5/2005 | Carver et al. |
| 2005/0114906 A1 | 5/2005 | Hoarty et al. |
| 2005/0132291 A1 | 6/2005 | Wagner et al. |
| 2005/0132401 A1 | 6/2005 | Boccon-Gibod et al. |
| 2005/0138668 A1 | 6/2005 | Gray et al. |
| 2005/0181878 A1 | 8/2005 | Danieli et al. |

(56) References Cited

U.S. PATENT DOCUMENTS

| | | |
|---|---|---|
| 2005/0193425 A1 | 9/2005 | Sull et al. |
| 2005/0196139 A1 | 9/2005 | Blackketter et al. |
| 2005/0204030 A1 | 9/2005 | Koch et al. |
| 2005/0204385 A1 | 9/2005 | Sull et al. |
| 2005/0216932 A1 | 9/2005 | Danker |
| 2005/0235318 A1 | 10/2005 | Grauch et al. |
| 2005/0251820 A1 | 11/2005 | Stefanik et al. |
| 2005/0262530 A1 | 11/2005 | Ruetschi et al. |
| 2005/0262542 A1 | 11/2005 | DeWeese et al. |
| 2005/0267809 A1 | 12/2005 | Zheng |
| 2005/0267810 A1 | 12/2005 | Zheng |
| 2005/0267820 A1 | 12/2005 | Zheng |
| 2005/0273809 A1 | 12/2005 | Kendall et al. |
| 2006/0010476 A1 | 1/2006 | Kelly et al. |
| 2006/0053049 A1 | 3/2006 | Nolan |
| 2006/0063590 A1 | 3/2006 | Abassi et al. |
| 2006/0068911 A1 | 3/2006 | Pirich et al. |
| 2006/0075430 A1 | 4/2006 | Park |
| 2006/0075432 A1 | 4/2006 | Abbadessa et al. |
| 2006/0087987 A1 | 4/2006 | Witt et al. |
| 2006/0101499 A1 | 5/2006 | Aravamudan et al. |
| 2006/0143653 A1 | 6/2006 | Suh |
| 2006/0154710 A1 | 7/2006 | Serafat |
| 2006/0154725 A1 | 7/2006 | Glaser et al. |
| 2006/0161950 A1 | 7/2006 | Imai et al. |
| 2006/0190966 A1 | 8/2006 | McKissick et al. |
| 2006/0200842 A1 | 9/2006 | Chapman et al. |
| 2006/0294568 A1 | 12/2006 | Walter |
| 2006/0294572 A1 | 12/2006 | Walter |
| 2007/0067805 A1 | 3/2007 | Macrae et al. |
| 2007/0094702 A1 | 4/2007 | Khare et al. |
| 2007/0107035 A1 | 5/2007 | Howe et al. |
| 2007/0124763 A1 | 5/2007 | Ellis |
| 2007/0124795 A1 | 5/2007 | McKissick et al. |
| 2007/0136773 A1 | 6/2007 | O'Neil et al. |
| 2007/0150338 A1 | 6/2007 | Malik |
| 2007/0155506 A1 | 7/2007 | Malik |
| 2007/0157235 A1 | 7/2007 | Teunissen |
| 2007/0168884 A1 | 7/2007 | Weeks et al. |
| 2007/0186269 A1 | 8/2007 | Malik |
| 2007/0208766 A1 | 9/2007 | Malik |
| 2008/0155616 A1 | 6/2008 | Logan et al. |
| 2008/0212941 A1 | 9/2008 | Lillethun et al. |
| 2009/0069038 A1 | 3/2009 | Olague et al. |
| 2012/0331503 A1 | 12/2012 | Gray et al. |
| 2013/0012318 A1 | 1/2013 | Walter |
| 2013/0079127 A1 | 3/2013 | Malik |
| 2013/0079129 A1 | 3/2013 | Walter et al. |
| 2013/0227491 A1 | 8/2013 | Malik |
| 2013/0254818 A1 | 9/2013 | Gray et al. |

FOREIGN PATENT DOCUMENTS

| | | |
|---|---|---|
| WO | 02086746 A1 | 10/2002 |
| WO | 03085982 A2 | 10/2003 |
| WO | 2004053732 A2 | 6/2004 |

OTHER PUBLICATIONS

"Time Warner Introduces World's First Full Service Network in Orlando; Network offers First Digital Interactive Services Including Movies on Demand, Home Shopping and Interactive Games," Business Wire, Orlando, FL, Dec. 14, 1994, http://www.findarticles.com/p/articles/mi_mOEIN/is_1994_Dec_14/ai_ 15980182/print, 3 pages.
EnReach Technology, Inc. Demonstrates Next Generation of Interactive Television with Innovative Open PVR Solution, EnReach Technology, Inc., PRNewswire.com, San Jose, CA, accessed on Sep. 12, 2000, http://www.prnewswire.com/news-releases/ enreach-technology-inc-demonstrates-next-generation-of-interactive-television-with-innovative-open-pvr-solution-73208772.html, 2 pages.
IP Packet Structure, Connected: An Internet Encyclopedia, Jan. 1998, Accessed Jan. 6, 2010, http://web.archive.org/web/19980118170657/http://www.freesoft.org/CIE/Course/Section3/7.ht m, 5 pages.
U.S. Appl. No. 13/769,570 entitled "Interactive Program Manager and Methods for Presenting Program Content", filed Feb. 18, 2013.
U.S. Appl. No. 13/790,777 entitled "Interactive Content with Enhanced Network Operator Control", filed Mar. 8, 2013.
Fennis, B. et al., "Stay Tuned: We Will Be Back Right after These Messages"; Need to Evaluate Moderates the Transfer of Irritation in Advertising, Journal of Advertising, vol. 30, No. 3 (Autumn, 2001), M. E. Sharpe, Inc., p. 15-25.
Olsen et al., "TiVo looks to tune in to advertisers", CNET News, Mar. 23, 2004, 3 pages.
Schroeter, R. et al., "Vannotea—A Collaborative Video Indexing, Annotation, and Discussion System for Broadband Networks", Knowledge Markup and Semantic Annotation Workshop, K-CAP 2003. Sanibel, Florida. Oct. 2003, Accessed on Jul. 22, 2009 at http://www.itee.uq.edu.au/~eresearch/papers/2003/schroeter-kcap03.pdf, 8 pages.
Schroeter, R., "Collaborative Video Indexing, Annotation and Discussion over High-Bandwidth Networks", Master's Thesis, School of ITEE, University of Queensland, Mar. 31, 2004, accessed on Jul. 22, 2009 at http://www.itee.uq.edu.au/~eresearch/projects/vannotea/pub/MastersThesis_RonaldSchroeter.pdf, 100 pages.
Adams, Michael et al., "Building a Switched Broadcast Network," Communications Technology, Access Intelligence LLC, Nov. 15, 2005, 5 pages.
Applebaum, Simon, "Video on the Move," Reed Business Information, CableVision, 25 (3): 26+, Aug. 14, 2000, 2 pages.
Berkowitz, Ben, "Developers Interacting with Sony Set-Top Box," Cable World; http://proquest.umi.com/pqdweb? did=73504121&sid=2&Fmt=4&clientld=31812&RQT=309&VName=PQD; May 21, 2001, 3 pages.
Bissell, R.A. et al, "The Set-Top Box for Interactive Services," BT Technology J., Oct. 1995, pp. 66-77, vol. 13, No. 4.
Cauley, Leslie, "Microsoft, Baby Bell Form Video Alliance," The Wall Street Journal, Technology & Telecommunications, p. B9, Sep. 26, 1994, 2 pages.
Chorianopoulous, Konstantinos, "The Digital Set-Top Box as a Virtual Channel Provider," Department of Management Science and Technology, Athens University of Economics & Business, CHI 2003: New Horizons, Apr. 5-10, 2003, Ft. Lauderdale, FL, pp. 666-667.
Dransfeld, Henning et al, "Interactive TV and Formula One: A Strategic Issue for Engine Suppliers," European Business Review, vol. 99, No. 5, pp. 292-299, 1999.
Droitcourt, J.L., "Understanding How Interactive Television Set Top Box Works . . . And What it Will Mean to the Customer," IEE, International Broadcasting Convention, Conference Publication No. 413, Sep. 14-18, 1995, pp. 382-394.
Elmer-Dewitt, Philip, "Ready for Prime Time?" Time Magazine Archive, http://www.time.com/time/archive/printout/0,23657,982050,00.html; Dec. 26, 1994, 3 pages.
Elmer-Dewitt, Philip, "Piay . . . Fast Forward . . . Rewind . . . Pause U.S. Firms Want to Wire America for Two-Way TV, But Their Systems Are Not Yet Ready for Prime," Time Magazine Archive, http://www.time.com/time/archive/ Dprintout/0,23657,980771 ,OO.html; May 23, 1994, 4 pages.
Grant, Peter, "On-Demand TV Expands via Underused Fiber Highways," Wall Street Journal, Dec. 17, 2004,4 pages.
Greenwald, John, "Battle for Remote Control," Time Magazine Archive, http://www.time.com/time/archive/printout/0,23657,982608,00.html; Mar. 1, 1995, 4 pages.
Hodge, Winston W., "Architecture to Deliver Video on Demand," Electronic Business Buyer, http://proquest.umi.com/pqdweb?did=1378419&sid=2&Fmt=2&clientld=31812&RQT=VName=PQD; Nov. 1994, 2 pages.
Jain, Sanjay K. et al, "Video on Demand: An Overview," Jamia Millia Islamia (A Central University), New Delhi-11 0025 India, Feb. 27-28, 2003, Proceedings: National Workshop on IT Services and Applications (WITSA2003), pp. 1-7.
Keough, Christopher, "Interactive TV Connection-Technology-Gold Pocket Interactive Acquires Mixed Signals Technologies," Los Angeles Business Journal, http://www. finadarticles.com/p/articles/mi_m5072/is_ 9 24/ai_ 91090671/ print; Mar. 4, 2002, 2 pages.

(56) References Cited

OTHER PUBLICATIONS

Leban, M., "Internet Search for TV Content Based on TV Anytime," IEEE 2003 Conference, Computer as a Tool, Slovenia, Proceedings, vol. 2, Sep. 22-24, 2003, 1 page.

Lin, Carolyn A. et al. "The Influence of Network Branding on Audience Affinity for Network Television," Journal of Advertising Research, 42(3): 19(14), Advertising Research Foundation, May 2002, 20 pages.

Loizides, Lydia, "Interactive TV: Dispelling Misconceptions in the Media," ACM Computers in Entertainment, vol. 3, No. 1, Article 7a, Jan. 2005, 5 pages.

Mermigas, Diane, "NBC Taking TV's Future by the Reins with On-Demand Content, Delivery," TelevisionWeek, Chicago, Sep. 15, 2003, vol. 22, Iss. 37, p. 12, http://proquest.umi.com/pqdweb?did=422367371 &sid=1 &Fmt=3&clientId=31812&RQT=309&VName=PQD; 4 pages.

Ren, Xiaoyan et al., "Set-Top Survival," Electronics Weekly, 20, Reed Business Information Limited, May 22, 2002, 3 pages.

Short, David, "A Quick Guide to Interactive Television," Broadcast Engineering, Feb. 2005, vol. 47, Issue 2, pp. 14-16.

Srivastava, H.O. et al, "On-Line Broadcast Archives for Interactive Video," IEEE Transactions on Broadcasting, vol. 43, No. 3, Sep. 1997, pp. 288-308.

Waterman, David, "Internet TV: Business Models and Program Content," Annual TPRC Research Conference on Information, Communication, and Internet Policy, Washington, D.C., Oct. 27-29, 2001, Revised Sep. 2001, pp. 1-27.

Zollman, Peter M., "Interactive Television," www.rtnda.org/resources/intnews/arttv.htm; 9 pages, printed Jan. 6, 2006.

"Building Dynamic Content for Set-Top Boxes," http://java.sun.com/products/javatv/content; Sun Microsystems, Inc., 4 pages, printed Jan. 9, 2006.

"Building the Perfect On Demand Beast: Television on Demand Presents a Dizzying Array of Technology Options," Broadcasting & Cable, vol. 133, Issue 44, Reed Business Information, Nov. 3, 2003, 6 pages.

"Chips: Motorola's Scorpion Chip Turns TV Into Interactive Information Appliance," Motorola Product Announcement, Work-Group Computing Report, v8, Aug. 11, 1997, 3 pages.

"Columbia TriStar Television Distribution and Microsoft Sponsor Development Competition for Interactive Television," Microsoft Press Pass, http://www.microsoft.com/presspass/press/2000/JanOO/CTTDpr.mspx; New Orleans, Jan. 25, 2000, 2 pages.

"EnReach Technology, Inc. Demonstrates Next Generation of Interactive Television with Innovative Open PVR Solution," EnReach Technology, Inc., PRNewswire.com, San Jose, CA, http://www.prnewswire.com/news-releases/enreach-technology-inc-demonstrates-next-generation-of-interactive-television-with-innovative-open-pvr-solution-73208772.html; Sep. 12, 2000, 2 pages.

"Enter Video-On-Demand," Electronic News, Aug. 31, 1998, pp. 34, 35, and 49.

"Liberate Technologies Completes Assessment Aboard Scientific-Atlanta Explorer Set Tops and Digital Interactive Network," Liberate Technologies Press, San Carlos, CA, http://press.liberate.com/archives/2002/050102_sa.php; May 2, 2002, 2 pages.

"Next-Generation Digital Video Network: Intelligent IP Infrastructure Solutions for Cable Operators Offering VoD Services," CED, 30(2), Reed Business Information, Feb. 2004, 8 pages.

"PBS Debuts Another First In Interactive Television; Wavexpress Selected To Provide Digital Broadcasting Platform," Washington, D.C., Market Wire, http://findarticles.com/p/articles/mi_mOEIN/is_2001_Feb_28/ai_70917712/; Feb. 28, 2001, 3 pages.

"PENTV: BBC Achieves Significant Interactive TV Audiences with Open TV," Digital Broadcasting.com, Aug. 13, 2001, http://www.digitalbroadcasting.com/article.mvc/PENTV-BBC-achieves-significant-interactive-TV-0001; 2 pages.

"Successfully Marketing Television on Demand: Operators, Programmers Look to Drive VOD Usage through Promotions, Improved Navigation," Multichannel News, 25(47): 29A, Reed Business Information ISSN: 0276-8593, Nov. 22, 2004, 4 pages.

"Time Warner Introduces World's First Full Service Network in Orlando; Network offers First Digital Interactive Services Including Movies on Demand, Home Shopping and Interactive Games," Business Wire, Orlando, FL, Dec. 14, 1994, http://www.findarticles.com/p/articles/mi_mOEIN/is_1994_Dec_14/ai_ 15980182/print; 3 pages.

"Worldgate Set to Deliver 'GO!TV Links' for Dynamic Interactive TV," Response, 11 (1): 22, Advanstar Communications, Inc., Trevose, PA, Oct. 2002, 1 page.

Zap2it.com: "TV Listings Frequently Asked Questions," http://web.archive.org/web/20000903002526/www.zap2it.com/index/1, 1146,4_1_0_000,FF .html, Dec. 1, 2000, 3 pages.

Nintendo Gamecube™, WaveBird™ Wireless Controller, http://www.nintendo.com/consumer/downloads/wave_english.pdf, Nintendo, 2003, 2 pages.

Knightrider TV Intro Theme, IMDb.com, Inc., printed Mar. 18, 2009, http://www.imdb.com/title/tt0083437/; includes screen shot of You Tube Knight Rider TV intra Theme, 7 pages.

\* cited by examiner

SYSTEM AND METHOD FOR PROVIDING MEDIA CONTENT AND INTERACTIVE CONTENT

CLAIM OF PRIORITY

The present application is a continuation of and claims priority from U.S. patent application Ser. No. 10/335,735, filed on Jan. 2, 2003 and entitled "SYSTEM AND METHOD FOR PROVIDING TELEVISION SERVICES", which is a divisional of and claims priority from U.S. patent application Ser. No. 09/116,325, filed on Jul. 15, 1998 and entitled "SYSTEM AND METHOD FOR PROVIDING TELEVISION SERVICES", now issued as U.S. Pat. No. 6,567,982, which is a continuation of and claims priority from U.S. patent application Ser. No. 08/428,718, filed on Apr. 25, 1995 and entitled "SYSTEM AND METHOD FOR PROVIDING TELEVISION SERVICES", now issued as U.S. Pat. No. 5,818,438. The contents of U.S. patent application Ser. No. 10/335,735, U.S. patent application Ser. No. 09/116,325 and U.S. patent application Ser. No. 08/428,718 are expressly incorporated herein by reference in their entirety.

FIELD

The present disclosure relates in general to the field of television and in particular to the field of interactive television.

BACKGROUND

Advances in telecommunications and computing technology are leading to the provision of interactive television (TV) on a large scale. Interactive TV involves the use of video gateways and video transport of sufficient bandwidth for video programmers and enhanced video gateway providers to offer their services to residential and business subscribers. Where such facilities are available, subscribers will not only be able to access these services by passively receiving them, but will also be able for the first time to interact with the service providers by communicating requests and commands to the providers via the same path over which the programming services are provided (or even via other paths or drivers).

Interactive TV service is capable of supporting at least the following services: (1) traditional broadcast and cable television programming; (2) video services, such as pay-per-view (PPV), near video-on-demand (NVOD), video-on-demand (VOD), promo channels, electronic program guides, etc.; (3) cable delivered PC-based services; and (4) interactive services, through the use of a combination of compression and digital video technologies. Interactive TV service also permits menuing capabilities and upstream signaling from subscribers to service providers. A subscriber interactive TV connection may, for example, provide subscribers with a screen of available enhanced video gateway providers and/or video programmers and their telephone numbers, or a menu to interactively order services and/or programs.

Interactive television may be provided over any number of paths, including coaxial cable or optical fiber, hybrid fiber/coaxial, or any other suitable path that accommodates sufficient bandwidth for desired analog and digital video channels as well as other telecommunications services. Content Providers may include, for example, providers of interactive or non-interactive over-the-air programming such as commercial television stations, cable programming such as weather, travel and entertainment channels, game channels, and on-line services of various types.

Interactive video enables a subscriber to request that an "interactive session" be established between an "interactive server" or similar platform maintained by an interactive video service provider and a "client" terminal device at the subscriber's premises. An interactive session is a two-way communication relationship, and is a precondition to interactive video services being provided to a subscriber's terminal device. Such a session utilizes the necessary downstream bandwidth and resources (defined below) for delivering interactive video service and the necessary upstream bandwidth from the subscriber's terminal device to issue commands to the interactive server. The terminal device may take the form of what has been termed a "set top box" (STB), or may be any other device capable of performing at least the following functions: (1) exchanging messages (including video-related data) over a network with the interactive server; (2) receiving messages from a user input device, such as a hand-held remote control unit; (3) translating video signals from a network-native format into a format that can be used by the television or display device; and (4) providing a video signal to a television or other display device. A STB may also be capable of performing other functions, such as: (1) inserting alphanumeric or graphical information into the video stream in order to "overlay" that information on the video image; (2) providing graphic or audio feedback to a user; or (3) possibly the most basic function, simply routing a traditional broadcast signal to a viewing device to which the STB is connected.

The STB "client" is "served" by a facility which may be operated and maintained by the video service provider. This "interactive server" provides, in response to a subscriber request, access to an "application," which may be something as straightforward as a video program, or may itself interact with the subscriber by transmitting, for example, a subscriber prompt or menu to allow the subscriber to assert a desired selection from among a set of given commands for the interactive server to carry out.

This added functionality is in large part the result of a historically unprecedented convergence of communications and computing technology. It makes possible, for the first time, features such as the following. In the game media environment, a subscriber may download video games or even play them interactively with the interactive server and/or with other subscribers. An interactive service subscriber may order "time shift TV," in which a particular program may be viewed at a time following its ordinary broadcast time. A subscriber may also selectively view desired parts of transactional, informational or advertising services. For example, a subscriber may view information on the weather predictions for a given location or at a given time, gather information relating to a particular sporting event or team, obtain news on demand, or query a system regarding a particular real estate market. Alternatively, a subscriber may participate in interactive entertainment programs, such as interactive game shows, interactive lottery or gambling, or request musical selections. Subscribers interested in educational programming, such as a school or a family residence, may invoke interactive "edutainment" or "how-to" programs. Interactive communication services, such as online services historically provided by the public telephone network, may also be accessed via interactive TV, which permits not only the rapid transfer of files to the subscriber but also interaction with other subscribers.

The combination of broadcast and interactive applications over interactive TV (e.g., interactive programs) creates a new mode of communication in which a user, when informed of the availability of an interactive application relating to the subject matter of a broadcast program, may invoke the application to investigate that subject matter more thoroughly and according to his or her own tastes.

Additionally, television viewers, who are accustomed to choosing at will between the available channels with instantaneous results, will expect to pass from one medium (e.g., broadcast) to another (e.g., interactive) "seamlessly" with the push of a button. To accommodate their viewer's needs, programmers may wish to provide broadcast programming, such as a commercial advertisement or a news program, and make available in the context of that program a related interactive television program.

The means by which interactive television and broadcast television are provided, however, are generally quite different. The two media, for example, are typically supplied from different sources and use different modulation techniques over different transmission paths. The originating source of broadcast programming is likely to be remote from those subscribers interested in invoking an interactive service, making telecommunication between the parties over a dedicated network prohibitively expensive and complex. By contrast, interactive servers, in order to avoid the expense of high bandwidth communications over such distances, can be located geographically close to a corresponding set of subscribers, unlike the programming sources or "Content Providers." An interactive server can therefore efficiently provide exclusive interactive access to a large number of applications by a large number of interactive subscribers.

The technical differences between broadcast programming and interactive applications, combined with the difficulties of providing interactive services at any rate, make the provision of a smooth transition between interactive and broadcast television a difficult proposition and a seamless transition from broadcast television to interactive television and back an elusive goal.

SUMMARY

The present disclosure provides an approach for viewer-friendly and virtually instantaneous transitioning from a first analog based television program to a second program, particularly an interactive application program, and further permits a similarly rapid and easily accomplished return to viewing the first program.

To accomplish this convenient and virtually instantaneous transition between programs such as a broadcast program and an interactive application or program, the present disclosure provides a system for permitting a provider of program content to furnish a video service provider with content, such as an interactive program or application, and for permitting the video service provider to transmit to the Content Provider an identifying code or address, such as an interactive callback address. The video service provider associates this identifying code or address with a location at which the program or application will be stored. The identifying code or callback address may be a program-specific code that can be used by subscribers to invoke the program from the video services provider directly. Alternatively, the identifying code may be a common identifying code or callback address (which might be called a "well-known callback address"), used by all subscribing viewers to access a program- or application-specific identifying code or callback address, which is in turn used to invoke the program.

According to the present disclosure, Content Providers may transmit the identifying code or callback address for a second program in coordination with a first program, so that viewers of the first program, who have access to systems operated by the video service provider, may invoke the second program, which may be an interactive program or application, using that identifying code or callback address.

Also according to the present disclosure, the Content Provider may transmit the identifying code or callback address in the first program signal, for example, in the vertical blanking interval of the video stream for that program. Alternatively, the identifying code or callback address could be provided in any other suitable out-of-band channel, especially one that is capable of being synchronized with the program signal, so that the identifying code or callback address may be transmitted at appropriate times during the program.

Additionally, the present disclosure permits the Content Provider to transmit with the identifying code or callback address additional information, such as information to be used at the subscriber site to generate a screen image indicating the availability of additional content from the video service provider.

The present disclosure also provides for an interactive server, which may be operated and maintained by the video service provider. The interactive server can service requests from Content Providers for identifying codes or callback addresses, such as interactive callback addresses, can store program content from Content Providers, such as interactive programs or applications, and can associate that content with an appropriate identifying code or address, such as an interactive callback address. The interactive server according to the present disclosure can also service requests for that content from subscribing viewers.

The subscribing viewers are provided with a set top box or similar device adapted to be coupled to a video distribution network to which one or more video service provider systems are also coupled, and also adapted to be coupled to a television, computer or any other suitable display device to reside either outside of, or within, the housing of the display device. The set top box includes a receiving set capable of receiving broadband signals over the video distribution network and possibly also over the air. The set top box also includes at least one processor coupled to the receiving set and programmed to detect the presence and content of an identifying code or callback address, such as an interactive callback address, received by the receiving set either in a program signal (typically in the vertical blanking interval of that signal) or possibly in an out-of-band signal. The set top box processor is also programmed to store the identity of the channel on which the program is being received in one of at least one information storage devices or memory means to which the processor is coupled. The processor is also programmed to detect and store information accompanying the transmission of the identifying code or callback address regarding an image to be displayed on the display device (such as a video screen "button" or "icon") to indicate the availability of content, such as an interactive application, from a video service provider. Alternatively, such information regarding the image to be displayed on the television or other display device may be pre-stored in an appropriate information storage device to which the processor is coupled. The processor is also coupled to a means for generating a video image based on the received or pre-stored "button" or "icon" information, or alternatively, is programmed to generate the video signal and is coupled to the display device in such a manner as to provide such a signal to that device.

Furthermore, the set top box processor is adapted to establish communication over the video distribution network with the video service provider, upon receiving a request from the subscribing viewer in response to seeing the screen button or icon. The processor may first store in the information storage device the identity of the channel on which the program then being viewed is being transmitted. A communication session over the network to the video service provider is then established by transmitting a message including the identifying code or callback address, such as the interactive callback address. If the identification code or callback address is a common identification code (for example, a "well-known callback address") the video service provider returns the program- or application-specific identification code or callback address, which the processor then may use to invoke from the video service provider the associated program or application.

The video service provider transmits to the set top box the identity of a network service (i.e., a network address) or a channel on which the requested program will be provided, and the set top box processor initiates a session with the indicated network service and/or causes the receiving set to tune to the channel. The set top box then receives the program or application from the video service provider. During that session, communication between the set top box and the video service provider may be two-way.

When the program or application is terminated, or when the user signals the set top box that viewing the second program or application is no longer desired, the communication session is terminated. The processor then retrieves the identity of the first program from the information storage device, and causes the receiving set to re-tune to the first program to which the viewer had been tuned.

It is accordingly an object of the present disclosure to provide a system for permitting a Content Provider to furnish a video service provider with program content, such as an interactive application or program, and for permitting the video service provider to transmit to the Content Provider an identifying code or address, such as an interactive callback address or a "well-known interactive callback address."

It is an object of the present disclosure to provide a system for permitting a Content Provider to furnish an identifying code or callback address along with a program for directly invoking another program, such as an interactive program furnished to subscribing viewers by the video service provider.

It is a further object of the present disclosure to provide a system for permitting a Content Provider to furnish a common identifying code or callback address (such as a "well-known interactive callback address"), used by all subscribing viewers to access a program- or application-specific identifying code or callback address that, in turn, is used to invoke the program content from the video service provider.

It is an additional object of the present disclosure to permit a Content Provider to transmit the identifying code or callback address in coordination with the program signal, such as in the vertical blanking interval of the video stream.

It is a further object of the present disclosure to permit a Content Provider to optionally transmit the identifying code or callback address in coordination with the program signal, but in any suitable out-of-band channel.

It is yet another object of the present disclosure to permit the Content Provider to transmit with the identifying code or callback address additional information, such as information to be used at the subscriber site to generate a screen image indicating the availability of additional content from the video service provider.

A further object of the present disclosure is to provide an interactive server capable of servicing requests from Content Providers for identifying codes or addresses for program content and to receive and store such content in association with the identifying code.

An additional object of the present disclosure is to provide an interactive server according to the present disclosure that can service requests for program content from subscribing viewers.

Another object of the present disclosure is to provide subscribing viewers with a set top box for detecting the presence and content of an identifying code or callback address transmitted in coordination with a-program, to store for later retrieval the identity of the channel on which the program is being received, to generate a screen image for display on a display device based on information either pre-stored or transmitted with the identifying code, to establish a session with the video services provider using the code, and upon termination of the session, to fetch the identity of, and re-tune to, the channel the subscriber was originally watching.

DETAILED DESCRIPTION

Figure 1:
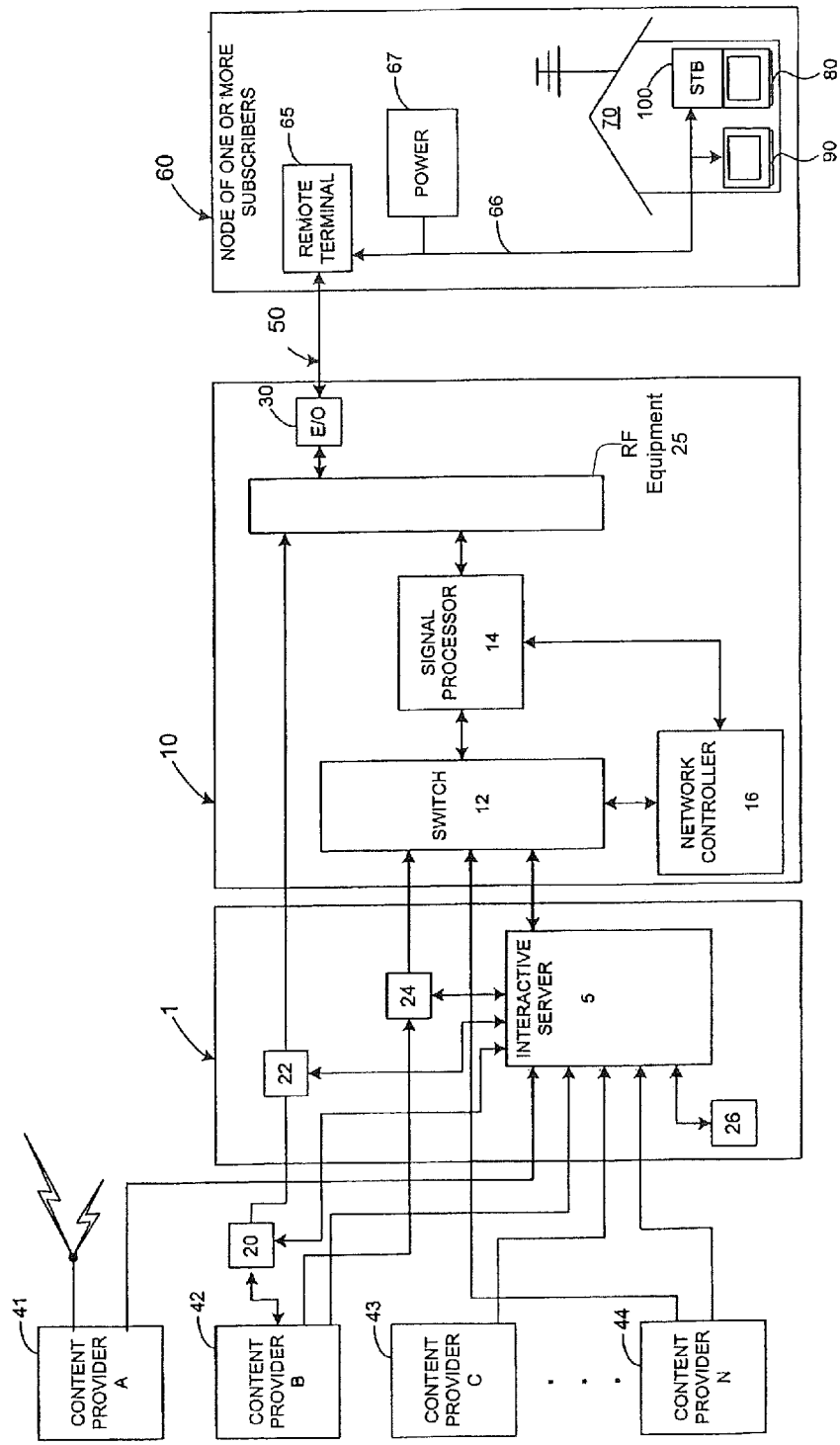
FIG. 1 is a high level functional block diagram of certain environment and components of a system according to a preferred embodiment of the present disclosure.

High-Level Architecture of an Embodiment of an Interactive Video Services Network FIG. 1 shows the primary components used in a typical setting for implementing an embodiment of the systems, devices and methods according to the present disclosure. A video service provider 1, responsible for providing interactive applications, operates and maintains a system equipped to receive signals as well as interactive applications and other content from one or more Content Providers A, B, C, . . . , N, respectively referred to by numerals 41-44. The means by which interactive applications are furnished by the Content Providers to the video service provider 1 is discussed in detail below and in the section entitled "Assignment of Interactive Callback Address."

Content Providers may be any original or secondary source of programming or information generally, including, for example, interactive or non-interactive over-the-air programming such as commercial television stations, cable programming such as weather, travel and entertainment channels, game channels, and on-line services of various types. Content Providers may alternatively broadcast directly to viewers, without the necessity of the broadcast being received and retransmitted to subscribers.

Over-the-air broadcast Content Providers such as commercial television stations, which may not provide programming by way of the video service provider 1 may nevertheless furnish the video service provider 1 with interactive applications associated with their broadcasts. An example of such a Content Provider is Content Provider A 41. According to an approach described below, a video service provider 1 that has received an interactive application from Content Provider A 41 may then provide access to the interactive application to subscribers 70 of the video service provider 1, in response to subscriber requests.

Content Providers that may not transmit programming to viewers over the air but which may provide it via cable, for example, such as weather, entertainment and game program providers, which may be represented by Content Provider B 42, may provide programming to viewers via the video service provider 1. This programming could be sent to the video service provider 1 in the form of an RF transmission, in which case the signal would be received and suitably processed by RF equipment 25. Alternatively, the programming might be transmitted to the video service provider 1 over, for example, a network according to a cell- or packet-switching or other suitable protocol. In the latter event, the programming signal could be received at network provider 10 via the video service provider 1 and switch 12. Switch 12 would in turn provide the received signal, along with numerous other signals it would in general handle, to signal processor 14, which conditions the signal for receipt and transmission by RF equipment 25.

Content Providers A-N may also furnish the video service provider 1 with one or more interactive applications which the video service provider 1 may in turn provide to subscribers 70 of the video service provider 1 in response to subscriber requests.

Other providers of television content such as advertisers, which may be represented by Content Provider C 43, may not provide services to viewers but rather furnish content originating with them to broadcasters that incorporate that content into their own broadcasts. They may also furnish interactive applications to the video service provider 1, as further described below. The video service provider 1 may then provide access by subscribers 70 to the interactive application.

Signals containing programming furnished by the Content Providers A-N (ref. numerals 41-44) may have inserted into them interactive callback addresses by one or more ICA insertion mechanisms. For example, ICA insertion mechanism 20 can be connected via suitable communication paths to Content Provider B 42 and to interactive server 5. Insertion mechanism 20 can be any known equipment for inserting information in a television signal, for example, in line 21 of the vertical blanking interval of an NTSC video signal. Content Provider B 42 may decide to transmit a broadcast, such as a commercial, having an associated interactive component or application that may have been provided to the video service provider 1 and is stored in the interactive server 5. Content Provider B 42 then queries interactive server 5 for the network address and application ID for the associated interactive component. In response to the query, the interactive server 5 identifies the network address and application ID for the associated interactive component which, together, constitute an interactive callback address or ICA. Content Provider B 42, which is able to issue instructions to ICA insertion mechanism 20, inserts the ICA received from the interactive server 5 into the transmission (e.g., of the commercial) when it is broadcast. As will be further described below, a properly equipped subscriber STB 100 will be able to sense the ICA on that broadcast channel and then display a button or icon on the viewing screen over the broadcast channel and also store the ICA. If the subscriber selects the displayed button, the STB 100 establishes a session with interactive server 5 and receives the interactive program or application associated with the broadcast.

An ICA may be inserted in a broadcast signal by other means. For example, ICA insertion mechanism 22 can be operated and controlled by the video service provider 1. ICA insertion mechanism 22 can be any known mechanism for inserting information into a television signal (as with ICA insertion mechanism 20). A communication path is established between insertion mechanism 22 and interactive server 5. ICA insertion mechanism 22 is also in communication with Content Provider B 42 and with RF equipment 25 in network provider 10. Content Provider B 42 may decide to air a broadcast, such as a commercial, having an associated interactive component or application available on interactive server 5. As shown in FIG. 1, Content Provider B 42 may broadcast directly to RF equipment 25 or through switch 12. In the event that the broadcast will be directly to the RF equipment 25, Content Provider B 42 prior to or during airing of the broadcast transmits a notice to video service provider 1 that the broadcast program is to be transmitted at a given time. In response to this notice, the interactive server 5 identifies the network address and application ID for the interactive component associated with the broadcast, which, together, constitute an interactive callback address or ICA. Interactive server 5, which maintains control over the ICA insertion mechanism 22 inserts the ICA received from the interactive server 5 into the transmission (e.g., the commercial) when it is broadcast and communicates the resultant signal to RF equipment 25 of network provider 10.

In the event that a Content Provider such as Content Provider B 42 is transmitting a broadcast via switch 12 in network provider 10, ICA insertion mechanism 24 is in communication with interactive server 5, Content Provider B 42, and switch 12 of network provider 10. As with the ICA insertion mechanism 24, Content Provider B 42 prior to or during airing of the broadcast transmits a notice to video service provider 1 that the broadcast program is to be transmitted at a given time. In response to this notice, the interactive server 5 identifies the network address and application ID for the interactive component associated with the broadcast, which, together, constitute an interactive callback address or ICA. Interactive server 5, which maintains control over the ICA insertion mechanism 24, as well as ICA insertion mechanism 22, inserts the ICA received from the interactive server 5 into the transmission (e.g., the commercial) when it is broadcast, and communicates the resultant signal to switch 12 of network provider 10.

In one embodiment of the disclosure, a video service provider 1 provides its services using at least some of the components shown in FIG. 1. The services provided by video service provider 1 may include voice, data, and video services, including interactive TV and cable channel service, and including both service that is multi-cast (to all subscribers) and switched (to particular individual subscribers), which may be interactive in nature. The primary functionality of the service provider 1 in this embodiment is provided by interactive server 5, which stores and manages the interactive applications provided by the Content Providers, and which responds to requests from subscribers 70 during interactive sessions subscribers 70 initiate. Interactive server 5 is shown and described in greater detail in FIG. 6 and the accompanying text.

Although the present discussion focuses on the provision of interactive applications, the video service provider 1 may be an enhanced video gateway provider, offering service including menuing and navigation capabilities, billing and collections, information services, storage and order processing. As in the embodiment shown in FIG. 1, the "Level 2" or "L2" Service, presently defined, along with the subscriber 70 set top box ("STB") 100, by the Federal Communications Commission ("FCC") as the unregulated portion of a video services network, is implemented by the video service provider 1. In this embodiment, the video service provider 1 is physically separated from the "Level 1" or L1 service, defined by the FCC as the regulated portion of a video services network and the portion of the system known as "video dial tone," functionality of which is implemented by network service provider 10 in FIG. 1. In this configuration, the L1 service might serve a number of such video service providers (although only one is shown and described for convenience). Alternatively, the video service provider 1 may at the same site provide both L1 and L2 services.

Interactive server 5, which is part of the L2 Service, is linked to a switch 12, part of the L1 service, for transferring data according to any desired protocol or scheme, such as the ATM cell-switching protocol, for example. The switch 12 may also switch video signals from Content Providers, as shown FIG. 1 for Content Providers B-N (reference numerals 42-44, respectively), to one or more video signal processors 20 for delivery to the network distribution facilities. In an embodiment of the disclosure, signal processing equipment 14, network controller 16, RF equipment 25 and electrical/optical converter 30 all serve to interface the switch 12 with the broadband distribution system 50.

The signal processing equipment 14 receives digital video signals and transforms them into properly timed and mapped broadband signals for transmission to subscribers. One example of the standard according to which such transformation may be performed is the MPEG-2 standard (Moving Pictures Expert Group standard 2, an international video and audio compression and transmission standard described in ISO/IEC CD 13818-1, the contents of which are incorporated by reference herein); however, any other suitable standards, formats, protocols, data structures, sequences or organization schemes could also be employed just as easily and effectively.

Network controller 16 receives input via signal processor 14 from the STB 100 of subscriber 70 and sends output to the switch 12, signal processor 14, and to the interactive server 5 in order to establish network sessions that permit downstream transmission of broadcast and interactive applications from the interactive server 5, as well as upstream signaling from STB 100 of subscriber 70. The network controller 16 output to switch 12 and signal processor 14 also provisions network resources to achieve these functions.

The RF equipment 25 provides RF modulation and RF combining for transmission of video signals onto the broadband distribution system 50. It receives input from the switch 12 in, for example, ATM format and may receive input directly from Content Providers, such as the Content Provider B 42. It provides output in the form of RF transmission either directly (not shown) onto a broadband RF distribution network 50, or if the broadband RF distribution network is implemented with optical fiber, it provides output to electrical/optical converter 30. In this event, converter 30 transforms the input received from the RF equipment 25 and places it onto the broadband distribution system 50.

The switch 12, network controller 16, RF equipment 25, electrical/optical converting equipment 30 and broadband distribution system 50 together make up at least part of the L1 service provided by network service provider 10. Network service provider 10 is responsible for setting up and maintaining a communications interface between the interactive server 5 and the STBs 100 of a node 60 of subscribers. Network service provider 10 receives an application transmission from the interactive server 5 in the downstream direction. Network service provider 10 receives application transmission in the upstream direction from subscriber STBs 100 (to be discussed at greater length below) via broadband RF transmission.

Figure 6:
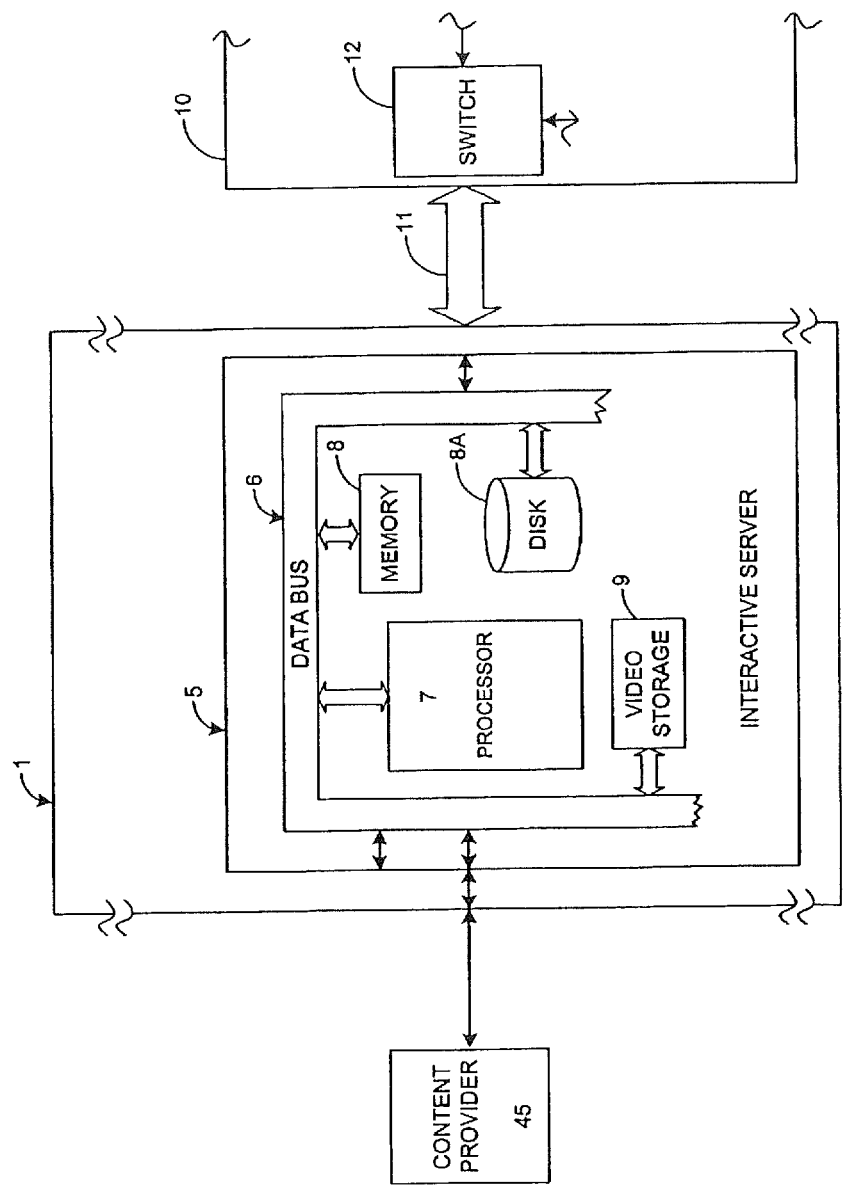
FIG. 6 is a high level diagram of an embodiment of an interactive server and certain environment according to the present disclosure.

As shown in FIG. 1, provision of programming by the Content Providers 41-44 may be: directly to viewers, including one or more subscribers 70, who may receive the signal, for example, with a conventional antenna (see Content Provider A 41); via the service provider without requiring digital switching or conversion to broadband, when the signal is already in broadband format which may be the case, for example, if the Content Provider is a provider of over-the-air or cable channel service (see Content Provider B 42); or via the service provider 1 through the switch 12 and signal processor 14. Not shown in FIG. 1, but described below with reference to FIGS. 6 and 7, is the provision of interactive applications from the Content Providers 41-44 to the video service provider 1, and the provision of an identifying code such as an interactive callback address from the video service provider 1 to the Content Providers 41-44.

A video signal provided by, or by way of, the video service provider 1 is placed on the broadband distribution system 50. Broadband distribution system 50 is most preferably a broadband network with bandwidth on the order of 750 Mhz, but it may feature a suitable bandwidth for the program content and functionality desired. In the presently described embodiment of the video dial tone system, the distribution is partitioned into a 50-750 Mhz downstream path for the provision of video services and a 5-42 Mhz upstream path for signaling by a subscriber 70 to the video service provider 1.

Broadband distribution system 50 provides a link between the video service provider 1 and one or more nodes 60 of subscribers 70. One such subscriber node 60 is shown in FIG. 1. In an embodiment of the video dial tone system, a subscriber node 60 may include a remote terminal 65, which converts optical signals received over the network to electrical signals. The electrical signals are then provided on a coaxial distribution system 66 to a number of taps (not shown), each of which may serve a number of subscribers 70.

Subscriber 70 is situated similarly to a typical television viewer in a number of respects. As shown in FIG. 1, the subscriber is equipped with one or more televisions 80, 90 or other suitable image monitoring devices. As depicted in the Figure, a television 90 may be connected directly to the coaxial distribution system 66, rather than via the STB 100, as in the case of television 80. The subscriber is further equipped with a set top box 100 that is also coupled to the coaxial distribution system 66. The STB 100 may be a device with certain similarities to conventional cable company STBs. However, the particular requirements of the STB 100 for implementing the present disclosure, including functionality not present in conventional STBs, are shown in greater detail in FIG. 8, which shows the components of an embodiment of an STB 100, and FIGS. 9 to 12, which depict the logic flow for four embodiments of an STB 100 according to the present disclosure and corresponding respectively to FIGS. 2A-B to 5A-B.

Operation of Several Embodiments of a System According to the Present Disclosure An interactive application must be associated with an identifying code such as an interactive callback address if it is to be invoked by subscribers. The provision of this code or address to subscribers in the context of other programming is what allows a subscriber 70 with the proper equipment and data links to invoke the interactive application. The provision of an address in response to a request by a Content Provider can be accomplished in several ways, to be discussed at further length below. In addition, the address can be provided to the subscriber 70 in various ways, and the manner in which this address (and information regarding the availability of an interactive application) is provided determines to a certain extent the overall functioning of the system. Four illustrative approaches to providing an address, which may be referred to as an "interactive callback address" or "ICA," will be discussed, along with the operation of systems according to the present disclosure for implementing these approaches, in relation to FIGS. 2A, 2B, 3A, 3B, 4A, 4B, 5A and 5B. These Figures present each of the four approaches as a logic flow. The approaches are to be taken without limitation as examples of ways in which devices, systems, and methods according to the present disclosure may be carried out. The division of these logic flows into the boxes shown in the Figures is also by way of example, rather than of limitation (as is the remainder of this document).

Figure 2A:
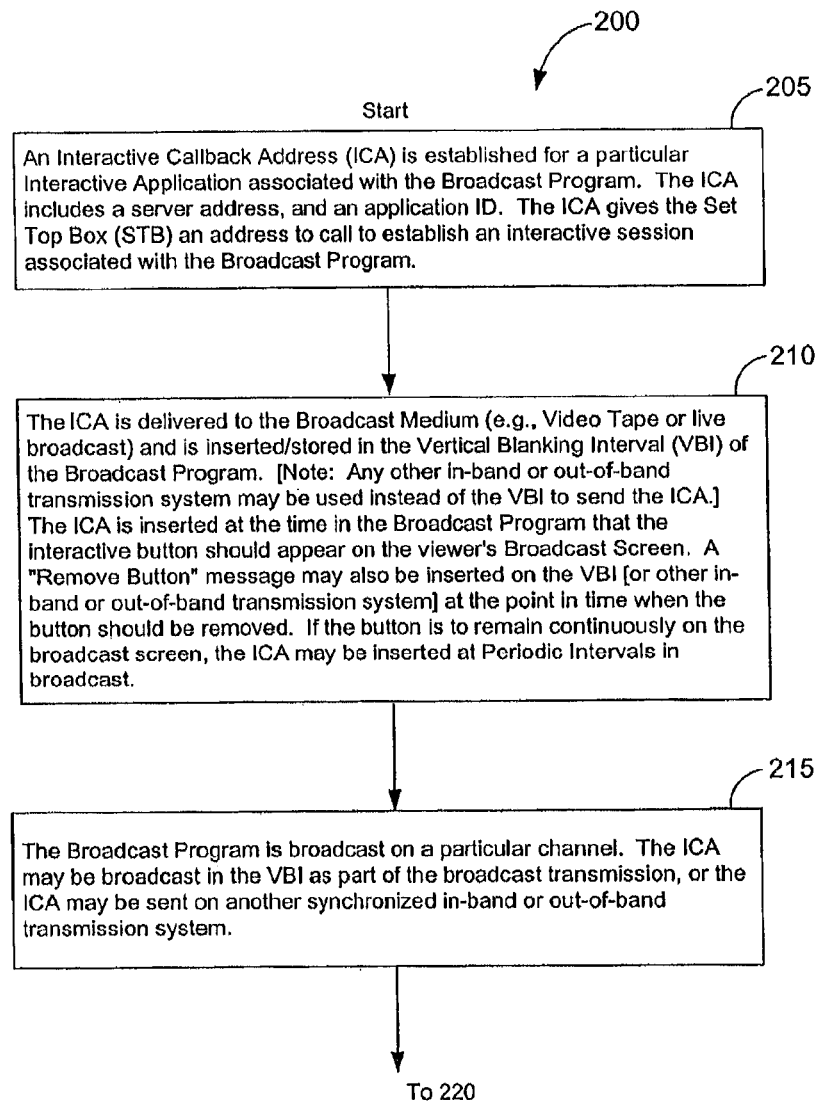
FIGS. 2A and 2B are a flowchart for the operation of a first embodiment of a system according to the present disclosure.

Application-Specific Interactive Callback Address Transmitted with Broadcast and Identified by Standard Button Overlay In FIG. 2A, at 205, an ICA is established (as further described below) for a particular interactive application associated with given programming. The ICA describes a logical address that would map to an interactive server's network address, includes an application ID, and may include a "timeout" period, which is the time that the button should be displayed on the broadcast screen. The STB 100 may also have a standard default timeout period, if no timeout is sent with the ICA. A subscriber's STB 100, when equipped with this ICA, can call the interactive server 5 to establish a session with the interactive application associated with the program.

At 210, the ICA is delivered to a medium (such as, for instance, a provider of program material such as video tape or live broadcast) and, in a preferred embodiment of the disclosure, is inserted or stored in the vertical blanking interval (VBI) of the desired program associated with the medium. As an alternative to providing the ICA in the VBI of a broadcast program, any other synchronized in-band or out-of-band transmission system may be used. As further described below, the ICA serves as a complete or partial basis for the STB 100 of a subscriber 70 to generate a signal representing a "button" for inclusion on the screen of the television 80 of subscriber 70. The ICA is inserted in the program such that the interactive button may be generated by a subscriber's STB 100 to appear at the desired time on the screen of a subscriber 70 tuned to that program. A "remove button" message may also be inserted in the VBI (or, again, another synchronized in-band or out-of-band transmission system) at the point in time when the button should be removed by the STB 100. Alternatively, the button may be removed if a new ICA is received, or if a timer expires, or finally, if the broadcast channel is changed. If, on the other hand, the button is to remain continuously on the screen, the ICA may be inserted at periodic intervals in the program.

At 215, the program is delivered on a given channel. If the ICA was inserted into the VBI, it will of course be included as part of the transmission. Alternatively, the ICA may be sent over another in-band or out-of-band transmission system synchronized with the program.

Figure 2B:
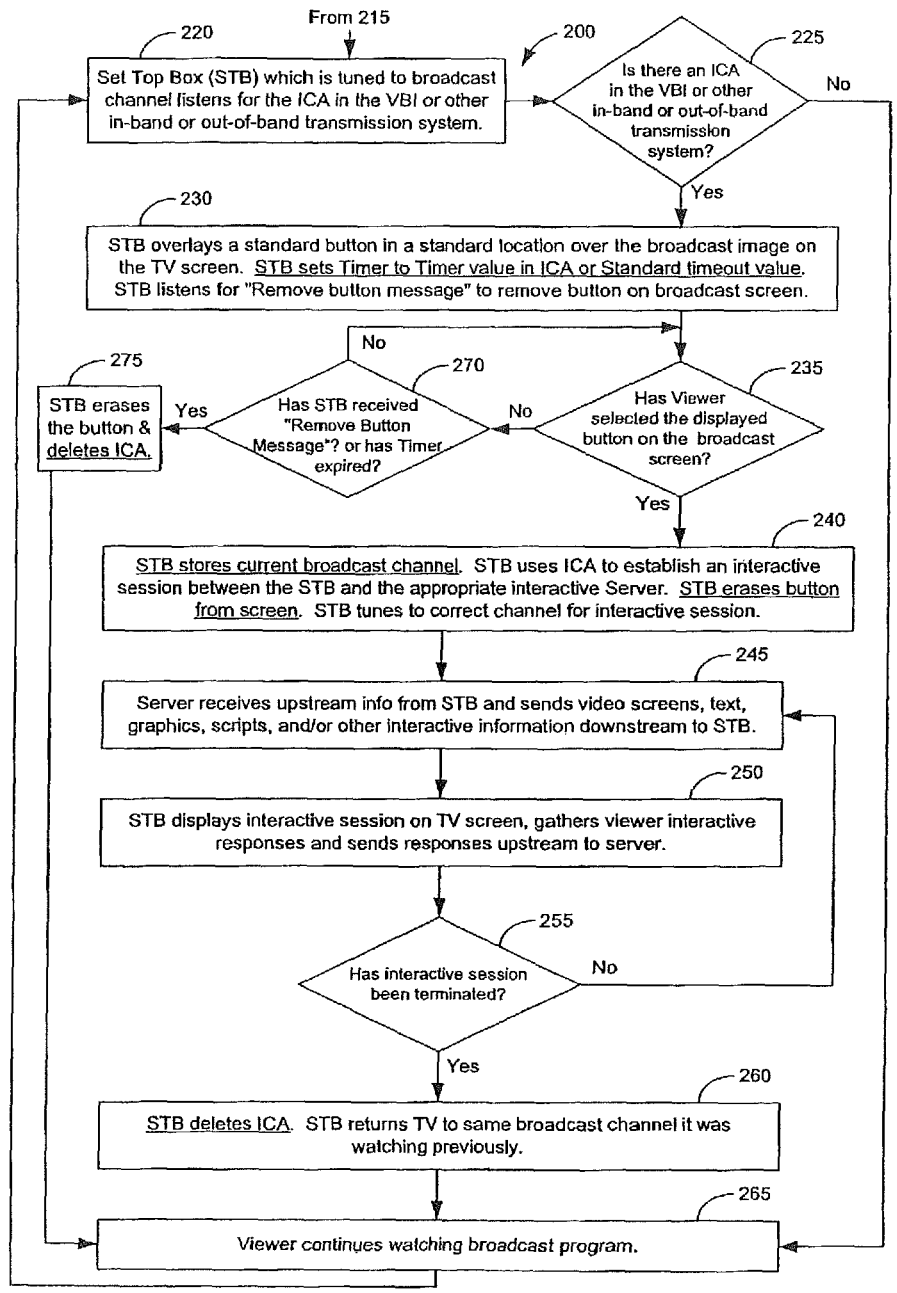

Referring to FIG. 2B, at 220, the STB 100, which is tuned to a given channel, listens for the ICA in the VBI or other appropriate transmission. If an ICA is detected, at 225, the STB 100, at 230, overlays a screen button having a standard predetermined configuration on the image displayed on the screen of TV 80 to which the STB 100 is connected. The provision and storage of the information required to generate the standard button is discussed at greater length below in the context of the STB 100. Also at 230, STB 100 sets an internal timer to a timer value sent as part of the ICA, or if no timer value is sent, to a standard timeout value. If no ICA is detected, the subscriber 70 continues watching the program, at 285, and the STB 100 continues to listen for an ICA, at 220.

As indicated at 235, if the subscriber 70 has selected the displayed button, at the next step, 240, STB 100 stores the identity of the current broadcast channel STB 100 then resolves the ICA from a logical address to a network address and then uses the ICA to establish an interactive session between itself and the interactive server 5 corresponding to the ICA. At this point the STB 100 stores the identity of the current channel for later retrieval, erases the button from the screen, and then tunes to the correct channel for maintaining the interactive session, which channel was received from the interactive server 5 according to standard protocols when STB 100 requested an interactive session.

As indicated at 245, the interactive server 5 receives upstream data from the STB 100 and, in response, sends appropriate video screens, text, graphics, scripts, and/or other information downstream to the STB 100. The STB 100, at 250, displays on the TV 80 the interactive session received from the interactive server 5, and sends subscriber 70 responses upstream to the interactive server 5.

As indicated at 255, the STB 100 checks whether the interactive session has been terminated. This event will occur at the end of the interactive application, in which case the interactive server 5 terminates the session. Termination may also, of course, occur if the subscriber 70 requests it. If the session has been terminated, the STB 100 deletes the ICA, retrieves the identity of the channel that was previously being watched, and re-tunes the TV 80 to that channel. If the session has not been terminated, the interactive server 5 continues to receive upstream information from the STB 100 and to send video screens, text, graphics, scripts, and/or other interactive information downstream to the STB 100, as shown at 245.

At 265, after the STB 100 has returned the TV 80 to the original program channel, at 260, the STB 100 queries whether the button is still on the screen. If it is, the next query, at 270, is whether the STB 100 has received a "remove button" message. If the STB 100 has received the "remove button" message, then, at 275, it erases the button. Alternatively, if the STB 100 has not received the "remove button" message, but the timer has reached the timer value transmitted with the ICA indicating that the timeout period has elapsed (described in further detail below in connection with the STB 100 logic), the STB 100 erases the button.

If, at 235, it had been determined by the STB 100 that the subscriber 70 did not select the displayed button, the STB 100 checks whether it has received a "remove button" message or if the timeout period has expired, at 270. If either of these conditions has occurred, the STB 100 erases the button at 275 and deletes the ICA. Following 275 or 280, the viewer continues watching the program, at 265, and, returning to 220, the STB 100 resumes listening for an ICA.

Figure 3A:
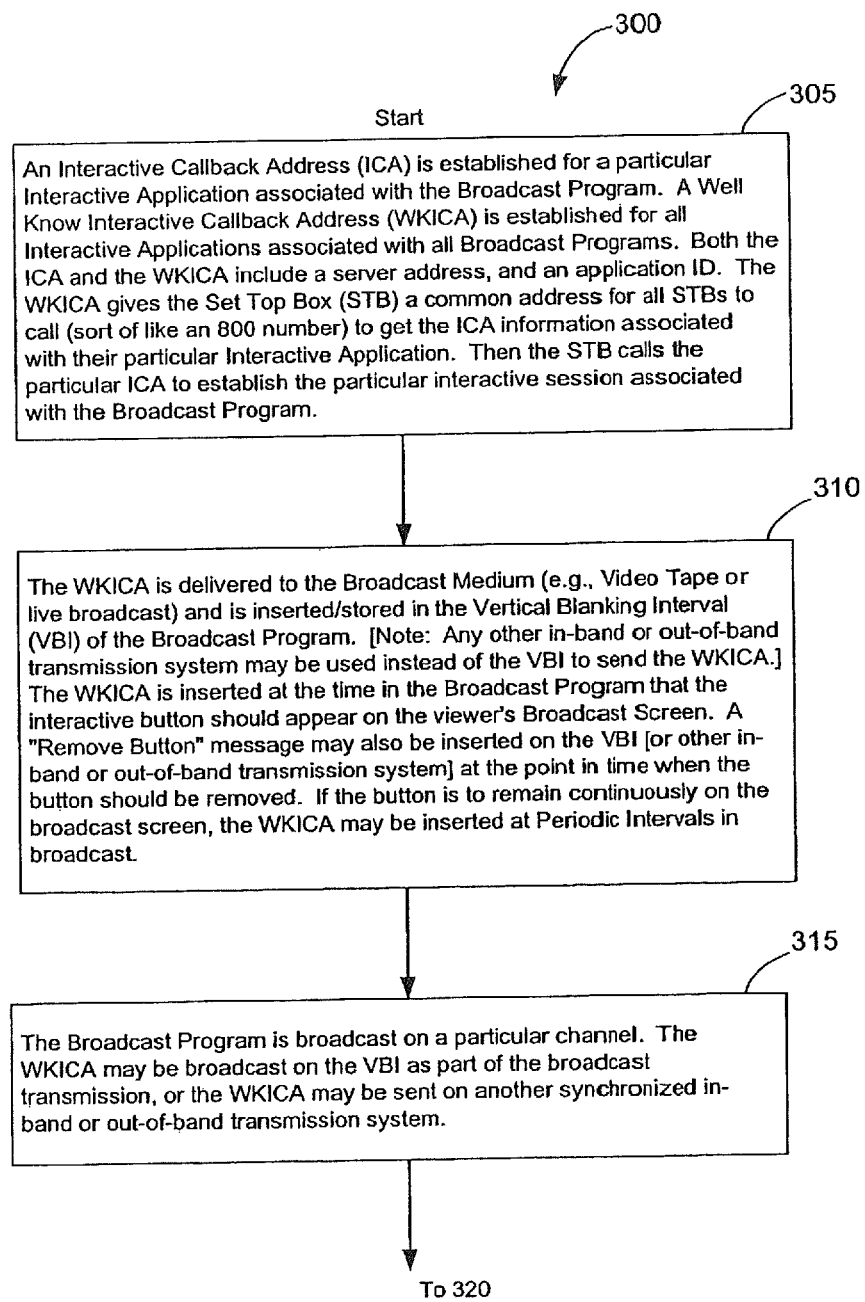
FIGS. 3A and 3B are a flowchart for the operation of a second embodiment of a system according to the present disclosure.
Figure 3B:
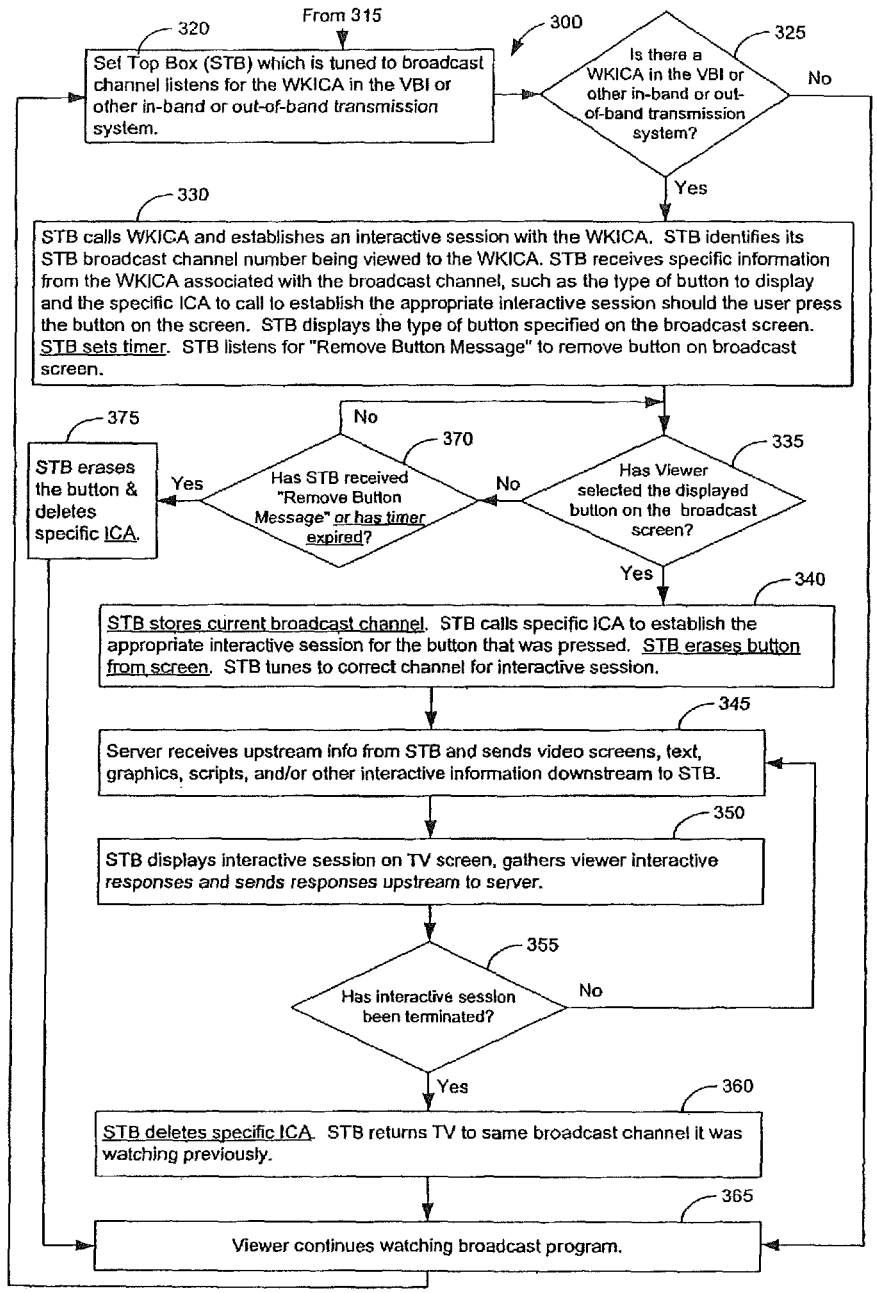

Well-Known Interactive Callback Address Transmitted with Program and Identified by Standard Button Overlay An alternative to the application-specific callback addressing scheme described above in connection with FIGS. 2A and 2B is presented in FIGS. 3A and 3B. These figures show the logical flow of an approach in which a single common identifying code or "well-known" interactive callback address is provided to all subscribers 70, indeed all viewers, but which only the subscribers 70 use if they elect to invoke that application from the interactive server 5.

At 305, a program- or application-specific identifying code or ICA is established (as further described below) for a particular interactive application associated with a given program. As with the first approach, the ICA describes a logical address that would sap to an interactive server's network address, includes an application ID, and may include a "timeout" period, which is the time that the button should be displayed on the broadcast screen. Also, a well-known interactive callback address ("WKICA") is established for all interactive applications associated with all programs. The WKICA generally includes the same sort of information as does the ICA.

The WKICA is a common address used by all STBs 100. The STBs 100 call the WKICA to get the ICA information associated with the particular interactive application, (which would include the server ID if the subscriber were to have access to more than one interactive server). Once the STB 100, using the WKICA, has obtained the desired ICA, it will call for the desired interactive application using that ICA.

At 310, the WKICA is delivered to a medium (for instance, a provider of program material such as video tape or live broadcast) and, in a preferred embodiment of the disclosure, is inserted or stored in the VBI of the desired program associated with the program medium. As an alternative to providing the WKICA in the VBI of a program, any other in-band or out-of-band transmission system may be used if it is synchronized with the program. The WKICA is inserted so that it will appear on the TV 80 screen of subscriber 70 during the desired time in the program. A "remove button" and/or time expiration message may also be inserted in the VBI (or other synchronized transmission system) at the point in time when the button should be removed. If the button is to remain continuously on the screen, the WKICA may be inserted at periodic intervals throughout the program.

The program is then transmitted at 315, on a particular channel. The WKICA is thus included in the VBI as part of the program transmission, or it may be sent on another in-band or out-of-band transmission system synchronized with the program.

Referring to FIG. 3B, the STB 100, tuned to a particular program channel, listens, at 320, for the WKICA in the VBI or other appropriate transmission system. If at 325, a WKICA in the VBI or other system is detected, an interactive session is established at 330; otherwise, the viewer continues watching the program and a timer is set, at 385.

At 330, the STB 100 calls the WKICA to establish an interactive session with the application identified by the WKICA. At the outset of the session, the STB 100 provides the application identified by the WKICA with the identity of the channel being viewed by the subscriber 70. The STB 100 receives from the application specific information associated with the program channel, such as the type of button to display and the specific ICA to call to establish the appropriate interactive session, assuming the subscriber 70 selects it by pressing the button. The STB 100 sets the timer and displays on the screen of the TV 80 the type of button specified by the application associated with the WKICA and proceeds to wait for a "remove button" message or for the period for which the timer is set to expire. The STB 100, using components and according to processing further described below, generates the button based in part on information previously stored, for example by software download, in the STB 100.

The STB 100 also waits, at 335, for the subscriber to select the button on the viewing screen. If a selected button is detected, the STB 100 at 340 stores the identity of the current broadcast channel in memory for later retrieval. It then calls the specific ICA it has received from the WKICA to establish the appropriate interactive session for the button that was pressed. The STB 100 also erases the button from the screen, and tunes to the appropriate channel for the interactive session.

During the interactive session, such as at 345, the interactive server 5 receives upstream information from the STB 100 and sends downstream to the STB 100 text, graphics, scripts, and/or other information. As shown at 350, the STB 100 displays the interactive session on the screen of TV 80, and receives viewer commands and interactive responses and sends those signals upstream to the interactive server 5.

The STB 100, as indicated at 355, determines whether the interactive session has been terminated, either at the subscriber's command, or if the end of the interactive application has been reached. If the interactive application has not been terminated, the STB 100 and the interactive server 5 continue providing the functionality in the states shown at points 345 and 350. If the interactive session has been terminated, the STB 100 at 360 deletes the specific ICA and retrieves from memory the identity of the program channel the subscriber 70 had been viewing and re-tunes to that channel so that the subscriber 70, at 365, can continue viewing the broadcast program on that channel.

If at 335 the viewer had not selected the broadcast screen button, STB 100 would, at 370, check whether a "remove button" message has been received or whether the timeout period has expired. If not, STB 100 returns to 335, checking whether the displayed button has been selected. If a "remove button message" has been received or the timeout period expired, STB 100 erases the button, at 375, and deletes the specific ICA. The viewer may then continue viewing the broadcast program at 365, and the STB 100, at 320, continues listening for a WKICA in the VBI.

Figure 4A:
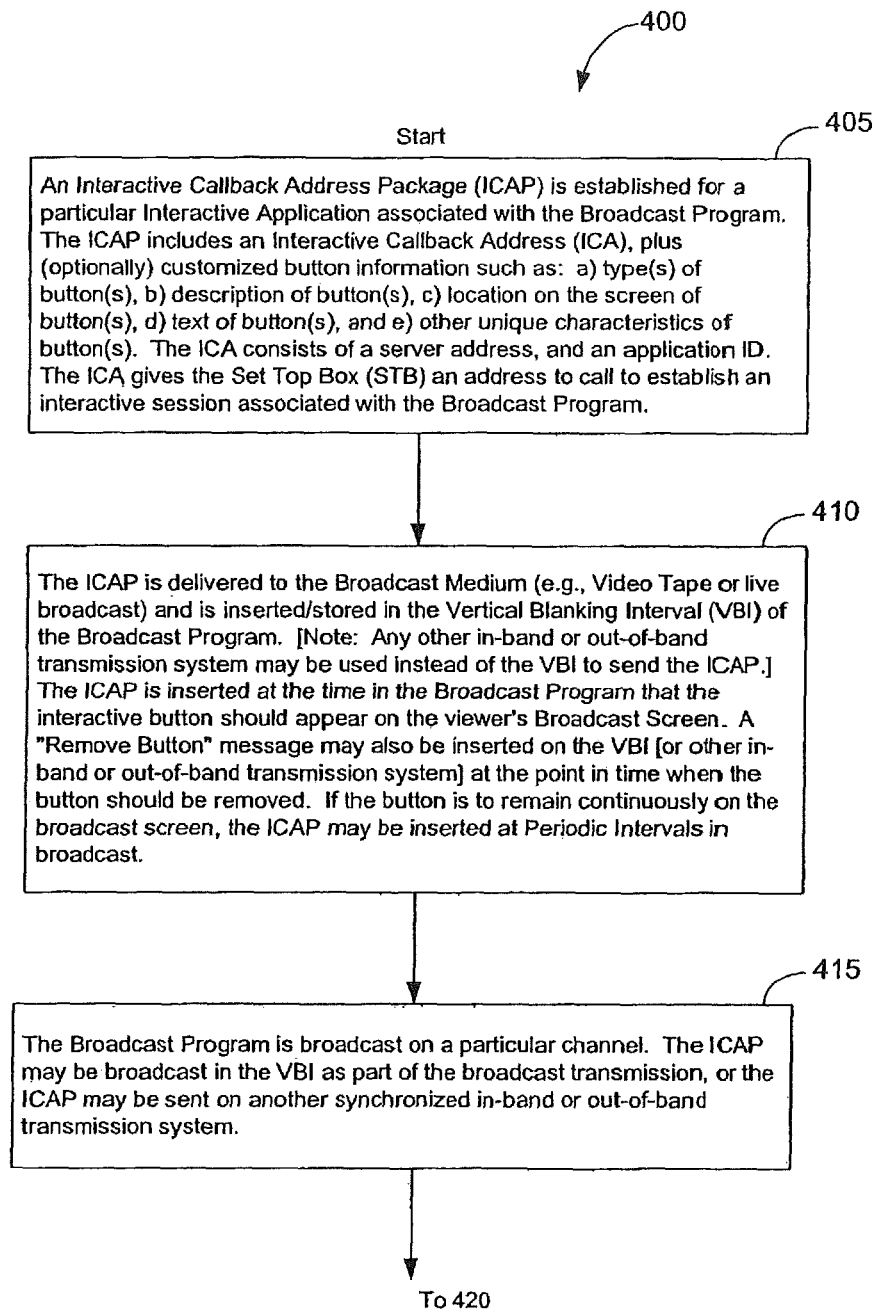
FIGS. 4A and 4B are a flowchart for the operation of a third embodiment of a system according to the present disclosure.
Figure 4B:
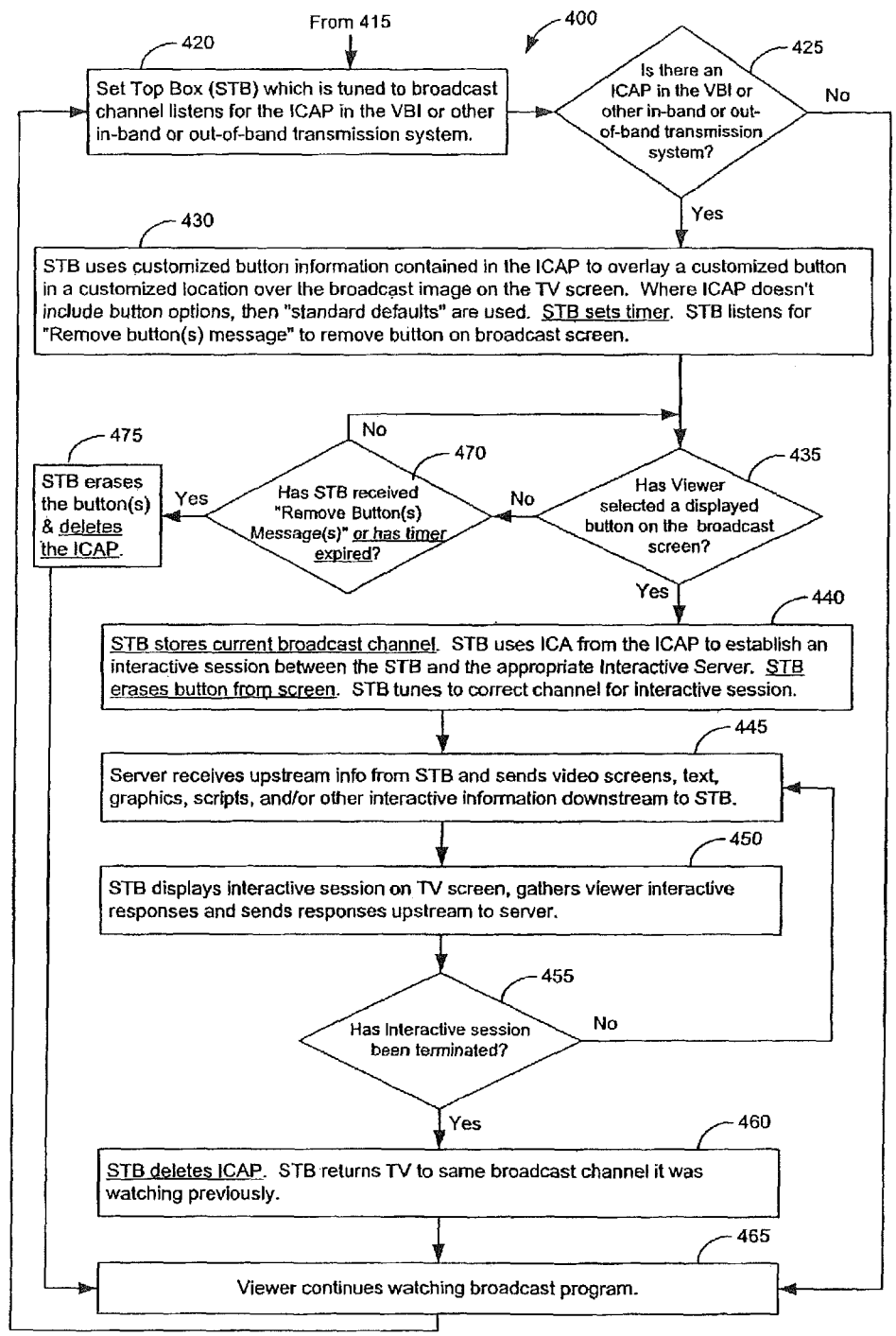

Application-Specific Interactive Callback Address Transmitted with Program and Identified by a Non-Standard Button Overlay A third embodiment of a system and method according to the present disclosure is depicted in FIGS. 4A and 4B. In FIG. 4A at 405 an interactive callback address package (ICAP) is established for an interactive application associated with a given program. This ICAP includes an ICA and may also include customized button information. This customized information may include:

a) type(s) of button(s);
b) characteristics of button(s);
c) location on the screen of button(s);
d) text of button(s); and
e) other unique characteristics of button(s).

The ICA describes a logical address that would map to an interactive server's network address, includes an application ID, and may include a "timeout" period, which is the time that the button should be displayed on the broadcast screen. As with the first described embodiment, the ICA will be used by the STB 100 to address a call to establish an interactive session associated with the program.

At 410, the ICAP is delivered to a program medium (for instance, a provider of program material such as video tape or live broadcast) and, in a preferred embodiment of the disclosure, is inserted or stored in the vertical blanking interval (VBI) of the desired program associated with the program medium. As an alternative to providing the ICAP in the VBI of a program, any other synchronized in-band or out-of-band transmission system may be used. The ICAP is inserted in the program so that it will appear on the subscriber's 70 screen at the desired time. In addition to the ICAP, a "remove button" message may also be inserted in the VBI (or other transmission system) so that the button will be removed at the desired time. If it is desired that the button remain continuously on the viewing screen, the ICAP may be inserted at periodic intervals throughout the program.

At 415, the program is transmitted on a given channel. Along with this program, the ICA may be included either in the VBI, or transmitted on another in-band or out-of-band transmission system synchronized with the program.

Referring to FIG. 4B, an STB 100 tuned to the channel listens at 420 for the ICAP in the VBI or other appropriate transmission. At 425, if an ICAP is detected, the STB 100, at 430, uses any customized button information contained in the ICAP to generate and overlay a customized button in a customized location over the image. If the ICAP does not contain information for a customized button, the STB 100 uses standard defaults that have been previously stored in the STB 100, for example via software download. The STB 100 sets an internal timer to a timer value sent as part of the ICAP, or if no timer value is sent, to a standard timeout value. When the button is being displayed, the STB 100 listens for the remove button message to remove the button.

If, at 425, no ICAP was detected, the subscriber 70 simply continues watching the program, at 485, and the STB 100 continues to listen for the ICAP, at 420.

If the subscriber 70 selects the displayed button, at 435, the STB 100, at 440, stores in memory the identity of the current channel. The STB 100 then uses the ICA from the ICAP it has received to establish an interactive session between the STB 100 and the appropriate interactive server 5. The STB 100 erases the button from the screen, and tunes to the correct channel for the interactive session, which channel was received from the interactive server 5 according to standard protocols when STB 100 requested an interactive session.

When the interactive session has been established, the interactive server 5, at 445, receives upstream information from the STB 100 and sends video screens, text, graphics, scripts, and/or other information downstream to the STB 100. As shown at 450, the STB 100 displays the interactive session on the screen of the TV 80. The STB 100 also receives viewer interactive responses and sends responses upstream to the interactive server 5.

If the interactive session is terminated, which may be a result of the subscriber 70 issuing a termination command, or simply as a result of the completion of the interactive application, STB 100 detects this event at 455 and, at 460, deletes the ICAP and re-tunes to the channel that was originally being watched and the subscriber 70 continues watching the program on that channel, at 465. If a termination is not detected, the interactive session continues at 445 and 450.

If, at 435, it had been determined by the STB 100 that the subscriber 70 did not select the displayed button, the STB 100 determines, at 470, whether it has received a remove-button message or whether the timer has expired. If neither event has occurred, the STB 100 continues checking whether viewing subscriber 70 has selected the button, at 435. If a remove button message has been received at 470, the STB 100 erases the button and deletes the ICAP, at 475; if it has not, the STB 100 at 475 erases the button and deletes the ICAP only if a button timeout period has been exceeded, at 470. After the STB 100 erases the button and deletes the ICAP, the viewing subscriber 70 continues watching the broadcast program, at 465. Also, the STB 100 resumes listening for the ICAP at 420.

Figure 5A:
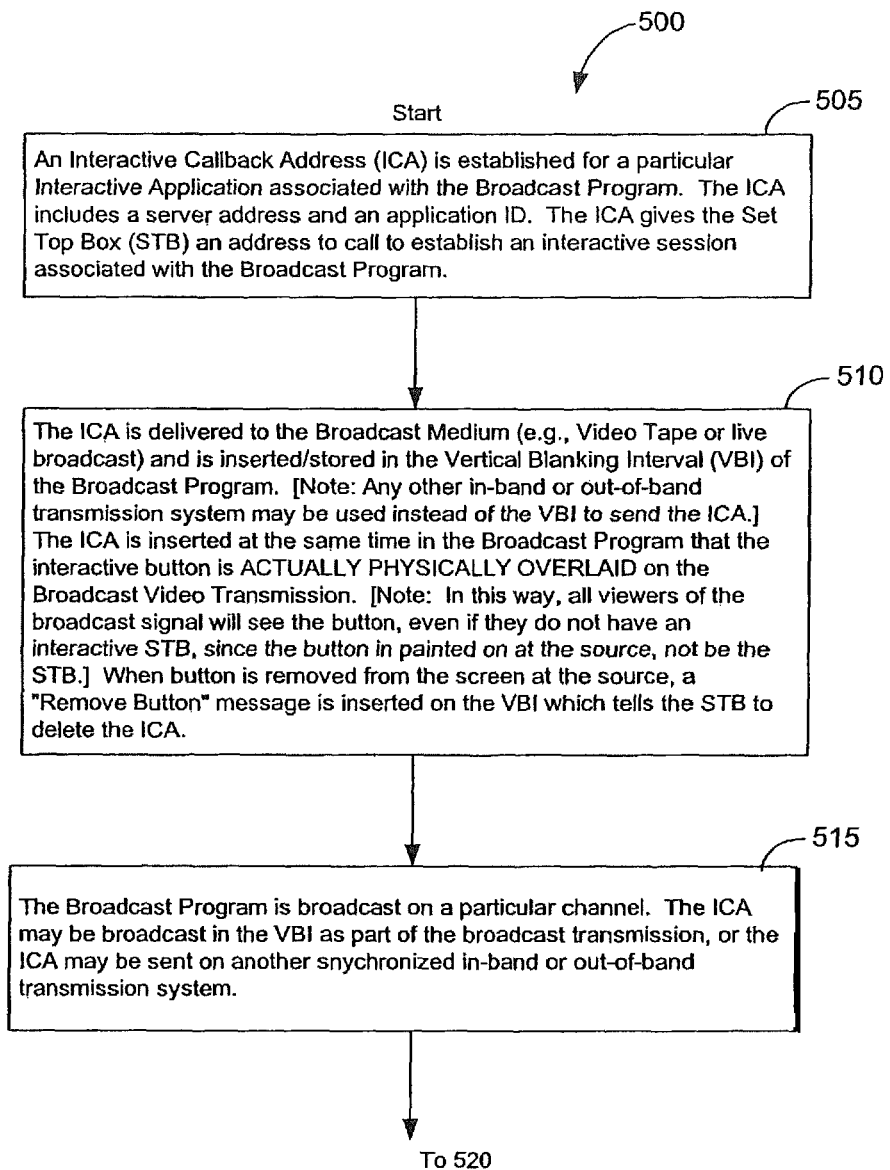
FIGS. 5A and 5B are a flowchart for the operation of a fourth embodiment of a system according to the present disclosure.
Figure 5B:
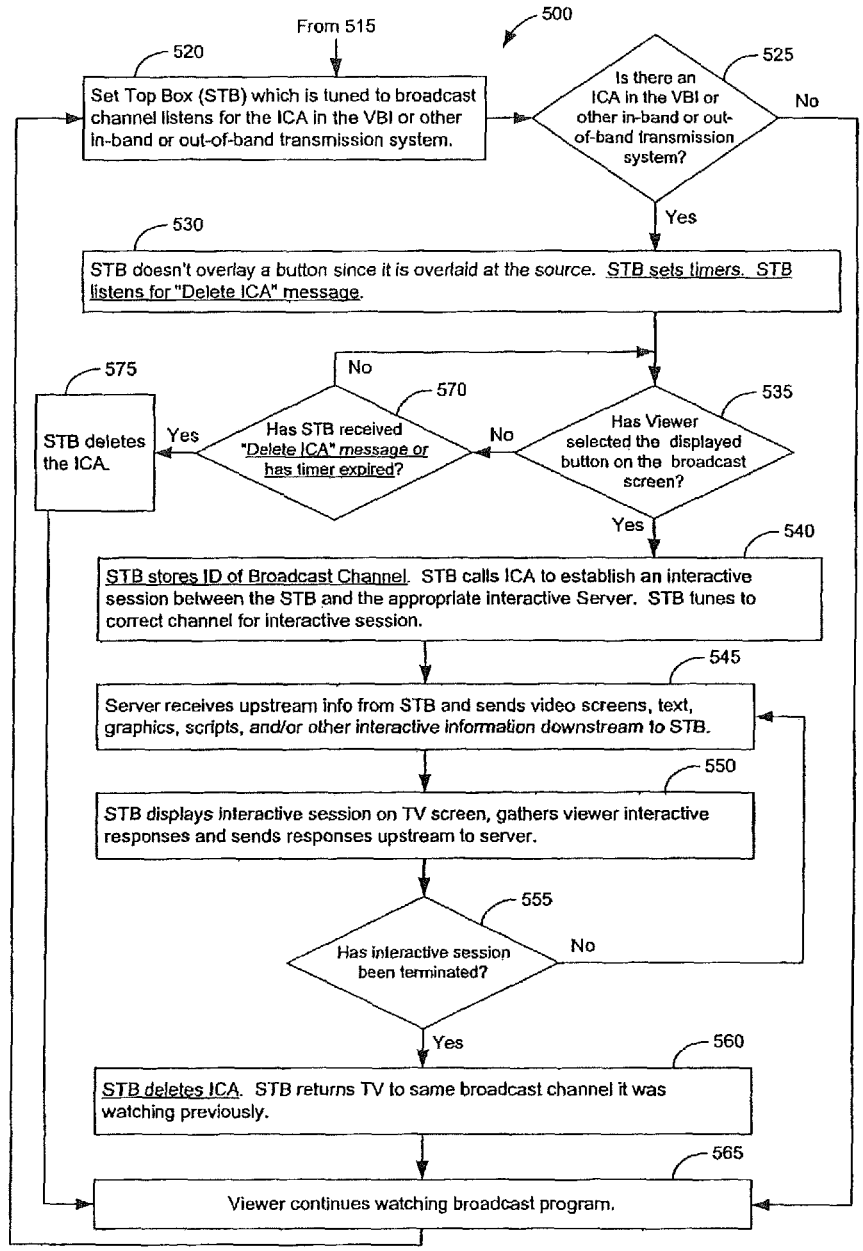

Application-Specific Interactive Callback Address and Button Overlay Both Transmitted with Program In a fourth embodiment of a system and method according to the present disclosure, the logical flow of which is illustrated at FIGS. 5A and 5B, an application-specific ICA is transmitted with the program, along with a button inserted on the video program at the point of transmission.

Referring to FIG. 5A, at 505, an ICA is established for a particular interactive application associated with a given program. As with the previously described embodiments, the ICA describes a logical address that would map to an interactive server's network address, includes an application ID, and may include a "timeout" period, which is the time that the button should be displayed on the broadcast screen. The ICA ultimately will be used by the STB 100 of the subscriber 70 viewing the program to invoke an interactive session associated with that program.

At 510, the ICA is delivered to a medium (for instance, a provider of material such as video tape or live broadcast) and, in a preferred embodiment of the disclosure, it is inserted or stored in the vertical blanking interval (VBI) of the desired program associated with the medium. As an alternative to providing the ICA in the VBI of a program, any other in-band or out-of-band transmission system may be used if it is synchronized with the program. The ICA is inserted into the program so that it will appear at the desired point in the program, and the button is also inserted into the program so that it will appear at that desired time on the screens of all viewers receiving the program, including viewers that are not subscribers and that lack an STB 100. When the button is removed from the program image (and thus the viewers' screens), a "remove button" message is inserted in the VBI. When the STB 100 of a viewing subscriber 70 receives this message, the STB 100 deletes the ICA. The timeout period can be sent with the ICA if the duration of the button display, and hence how long the ICA is to be active, is predetermined.

The program, at 515, is transmitted on a particular channel. As described above in connection with 510, the ICA may either have been incorporated in the transmission, or be sent on an in-band or out-of-band transmission system that is synchronized with the program.

STB 100 at 520 checks for an ICA in the VBI of the video stream (or in another suitable preselected transmission). As indicated at 525, if an ICA is detected, the STB 100 does not overlay a button, at 530, since the button is overlaid at the broadcast source and has appeared on the screen when the ICA arrived at the STB 100. Rather the STB 100 sets the timer and begins checking for a "delete ICA" message or timeout.

If the ICA was not detected, the subscriber 100 simply continues watching the program, at 565.

The STB 100, at 535, checks whether the subscriber 100 has selected the displayed button. If selection of the button is detected, the STB 100 stores the identity of the broadcast channel being viewed. It then uses the ICA to establish an interactive session, at 540, with the appropriate interactive server 5. The STB 100 receives and then tunes to the correct channel for an interactive session.

If, at 535, the subscriber 70 had not selected the button displayed on the screen of the TV 80, the STB 100 continues checking, as shown at 570, whether a "delete ICA" message has been received or if the timer has expired. If either or both these events have occurred, then the STB 100, at 575, deletes the ICA. After 575, the viewer continues watching the program, at 565.

During the interactive session, the interactive server 5, at 545, receives upstream information from the STB 100 and sends video screens, text, graphics, scripts, and/or other information downstream to the STB 100. At 550, the STB 100 displays the interactive session on the screen of the TV 80. It also receives viewer interactive responses and commands and sends them upstream to the interactive server 5.

The STB 100 checks, at 555, whether the interactive session has been terminated. If it has not, the interactive session continues, at 545 and 550. If the session has been terminated, which may have occurred as a result of a command issued by viewing subscriber 70, or due to the end of the interactive application having been reached, the STB 100 deletes the ICA, retrieves the identity of the channel, which subscriber 70 had been watching, and re-tunes to that channel.

The subscriber 70 continues watching the program, at 565. The STB 100 continues to listen for the ICA, at 520, in the VBI or other appropriate transmission.

Assignment of Interactive Callback Address

An interactive callback address (ICA) is associated with an interactive application to enable subscribers to invoke an interactive application, as well as to uniquely identify an interactive application for any number of additional reasons. The ICA describes a logical address that maps to an interactive server's network address, includes an application ID, and may also include a "timeout" period message, which indicates the amount of time that a button indicating the availability of an interactive application or program should be displayed on the broadcast screen. The ICA may be furnished in association with a program to subscribers in a variety of ways, two of which are described below. Once the ICA is received by a subscriber terminal device such as an STB 100, the ICA may be stored so that it will be available at the request of subscriber 70 to call and establish with an interactive server 5 an interactive session associated with a program. The ICA may be assigned in a number of ways, two of which are described below, with reference to FIG. 1, FIG. 6 and FIGS. 7A and 7B.

Case I: Locally Assigned Interactive Callback Addresses

When content, such as an interactive news program or a commercial advertisement, is specifically developed for an interactive platform, as may be the case for locally originating programming, a Content Provider 45 requests an ICA from a video service provider 1 operating an interactive server 5 linked to one or more nodes 60 of subscribers 70. This request may be made by any suitable means. It could be done simply by making a telephone call to the video service operator 2, or it could be done by purely electronic means, such as e-mail, or automatically, or remotely invoking an application on the interactive server 5 designed for this purpose. The Content Provider 45 also then transmits to the video service provider 1 the interactive application. This transmission may be done by physically sending the interactive application to the video service provider 1 on tape, magnetic disk, optical disk or other suitable medium; alternatively, it could be done by electronic or optical transmission of the data, such as over a network.

After receiving the request for the ICA, the interactive server 5 assigns an ICA consistent with the state of the interactive server 5 and its memory 8 and other storage devices 8A and 9. The video service provider 1 also stores the application received from the Content Provider in a suitable storage device, such as video storage 9, and stores the ICA and perhaps information relating to the interactive application in a database maintained, for example, in disk storage 8A. Such additional information may include an application ID selected by the video service provider 1.

Figure 7A:
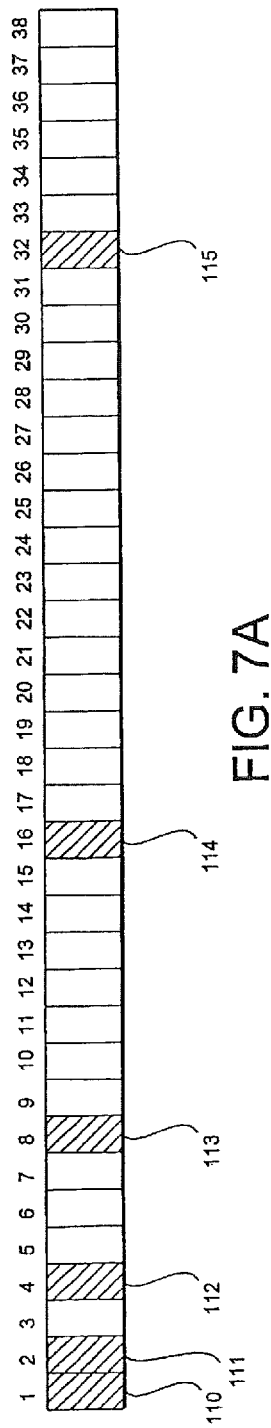
FIG. 7A is a diagram showing the format for an interactive callback address according to the present disclosure having error correction check bits.

If the interactive server 5 is called by a subscriber 70 with an ICA, the interactive server 5 may thus retrieve using the ICA any information necessary for locating and running the interactive application. The new ICA may be selected according to any suitable scheme. In one embodiment of the present disclosure, the ICA has a format of the form shown in FIGS. 7A and 7B. As shown in FIG. 7A, but without limitation, the ICA preferably comprises 32 bits. According to an error correction scheme, such as a Hamming code or other suitable approach, a number of checkbite or parity-type bits are incorporated into the ICA. In FIG. 7A, 6 such bits 110-115 are shown as bits 1, 2, 4, 8, 16, and 32 corresponding to the ICA content shown in FIG. 7B. Hence 38 bits are used to transmit the ICA, with a coding rate of about 0.84. Any error correction schemes suitable for minimizing errors in the transmission of an ICA having a known format may be used.

Figure 7B:
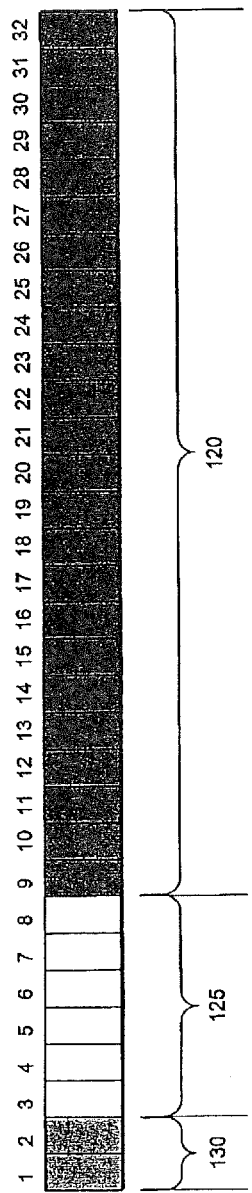
FIG. 7B is a diagram showing the contents of an interactive callback address according to the present disclosure, with the error correction check bits not shown.

In FIG. 7B, the components of the ICA are shown. Bits 9-32 contain a program identifier 120, including a server ID and an application ID. Bits 3-8 are used for an industry code 125, which is assigned to large Content Providers to uniquely identify them. Bits 1 and 2 correspond to time cycle identifier 130, which facilitates re-cycling of program identifiers: when a particular application no longer is being provided by the Content Provider identified by a particular industry code, the Content Provider can re-use a particular program identifier. Time cycle identifier 130 is prefixed to ensure uniqueness of the ICA when a program identifier is used an additional time. Where, as shown, the time cycle identifier 130 is allocated two bits, a given program identifier 120 may be used uniquely four times.

When the interactive application has been stored, a new ICA has been selected for the interactive application, and the ICA and interactive application information have been stored in a database, the video service provider 1 or interactive server 5 sends a message to the Content Provider 45. This message may include a description of the type of application, an ICA confirmation including the ICA itself, an application ID (including a server number and application number), any other information, such as billing information, and a timeout value for specifying the length of time a screen button should persist.

Case II: Content-Defined Interactive Callback Addresses

In case I, an interactive application may have been developed for a particular interactive server and was to be assigned an address by that server. As an alternative to case I, interactive applications associated with pre-developed content (that is, created specifically to be associated with the interactive application) may already be associated with and labeled with an ICA by the Content Provider 45. This may be, but is not necessarily, the case for nationally originating programmers. For such content-defined ICAs, the interactive application and the pre-assigned ICA are both transmitted to the desired video service providers. The transmission may be done simply by shipping a tape, magnetic disk, optical disk or other suitable medium to the video service provider, or alternatively, may be electronically or optically transmitted over a network. The receiving video service provider 1 or interactive server 5 stores the interactive application, then adds the ICA and assigns an application ID. An application ID is an identifier for purposes of internal organization and tracking by the video service provider 1. Thus, for a nationally originating program in which the ICA identifying the program is national, the interactive server 5 of (local) video service provider 1 translates the (national) ICA to a local server address of its internal database, for example on disk storage 8A. Once this information has been stored, a receiving video service provider 1 sends a confirmation message to the Content Provider 45, including what it has recorded as the ICA, the application ID, and a description of the application. As an alternative scheme, not shown in the Figures, the (local) video service provider 1 is linked to a national server running the interactive application, and the local server using the ICA provides a link from the subscriber to the national interactive server.

The Interactive Server

One or more interactive servers 5 may be maintained as part of the Level 2 service (L2, defined above in connection with FIG. 1) in order to provide service to subscribers in a particular geographical area. An embodiment of the interactive server 5 according to the present disclosure may be coupled to one or more transmission paths, such as a satellite downlink, for receiving programs. The interactive server 5 is also coupled to a level 1 network (L1, defined in connection with FIG. 1), through which it interacts with subscribers 70, receiving program requests and commands, and sending programming as requested by each subscriber.

An embodiment of an interactive server 5 is shown in FIG. 6. The interactive server 5 may include, for example, one or more processors 7, one or more memory devices 8, and one or more storage devices such as disk storage 8A. These components may be linked to one another by a data bus 6. The interactive server 5 may also include a video storage medium 9, in which device interactive applications supplied by Content Providers may be stored for retrieval upon request by a subscriber 70.

The interactive server 5 may receive input and provide output to a video service operator, represented schematically at reference numeral 2, or over data link 11 to the switch 12, or over data link 3A directly to a Content Provider 45. In response to a request by a Content Provider 45 for an ICA to be associated with a program, for example, the video service provider 1 may interact with the interactive server 5 via I/O mechanism 4 in order to obtain an interactive application address, at which an interactive application will be found when stored with the interactive server 5, and, if necessary, a port address, to combine with the address of the interactive server 5 itself for transmission to the Content Provider 45 via a communication link 3. Under an alternative scheme, a Content Provider 45 could establish a link with the interactive server 5 itself over communications link 3a and obtain an ICA directly.

When a video service provider 1 has received an interactive application from a Content Provider 45, the video service provider 1, via I/O mechanism 4, loads the interactive application into an appropriate storage medium, such as video storage 9, which-may be a separate storage medium from the interactive server memory 8 or the interactive server disk storage 8A, such that the interactive application may be retrieved using the interactive application address portion of the ICA furnished to the Content Provider 45.

The video service provider 1 may also interact with the interactive server 5 to perform system management functions such as data storage management, if such functions are not carried out automatically.

Set Top Box Architecture

A subscriber 70 to an interactive video service will be equipped with an STB 100 for receiving transmissions and initiating an interactive session. The functionality of the STB 100 may reside in a stand-alone device, literally a box that can be placed on, or at least near, the television, that is similar in outward form to conventional devices for receiving cable programs. The STB 100 functionality could alternatively be performed by hardware resident elsewhere, such as within the television or display console, or by any suitably equipped terminal device. Since the hardware may be proprietary to the interactive video provider and may generally be a physically independent device, the term set top box is used here, but the disclosure is not so limited.

Figure 8:
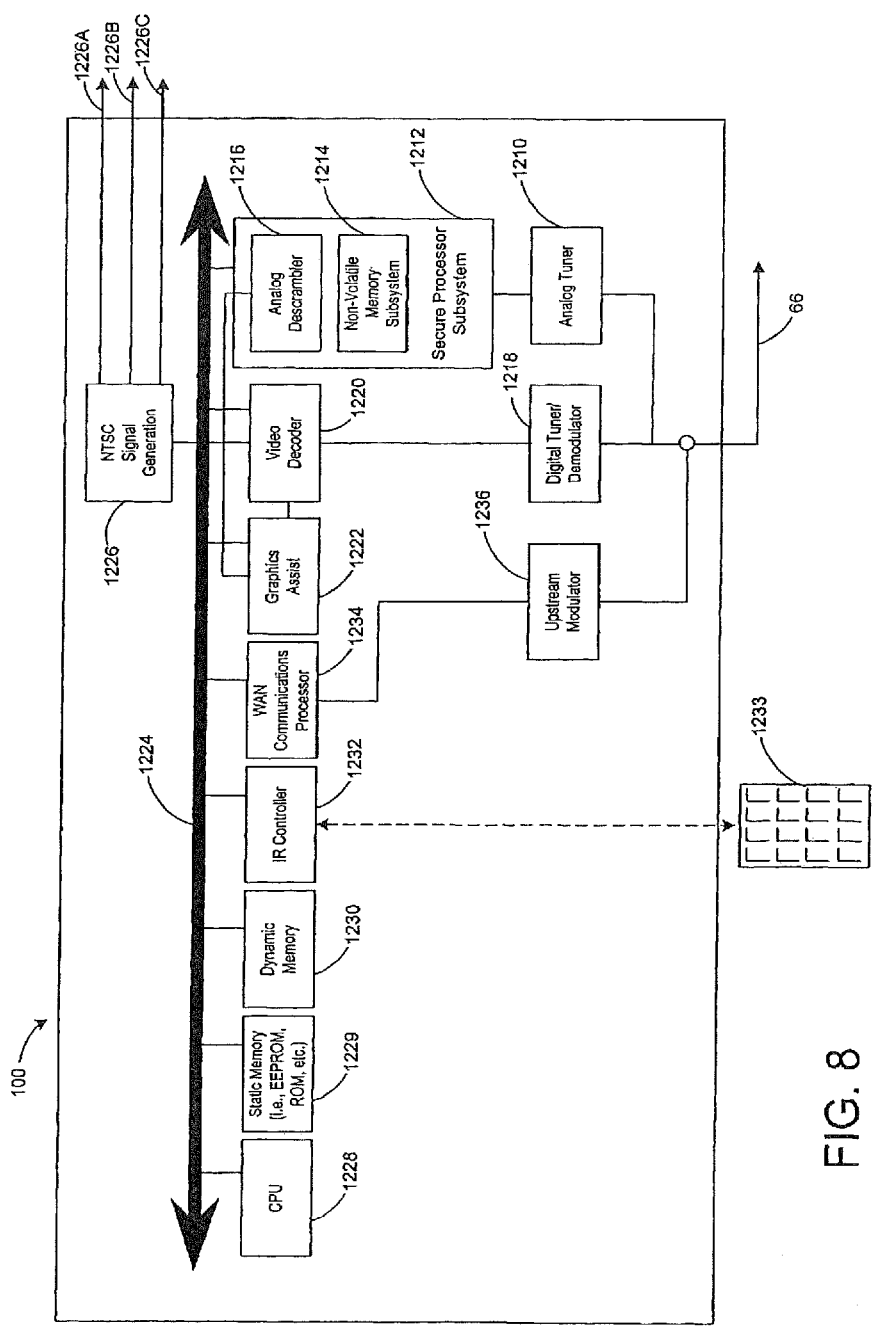
FIG. 8 is a high level schematic diagram of a preferred embodiment of a set top box according to the present disclosure including input and output means.

The components of an embodiment of an STB 100 that may be used to implement the system and method according to the present disclosure are shown in FIG. 8. STB 100 is coupled to coaxial distribution system 66, as was briefly described in connection with FIG. 1. Input to STB 100 received over coaxial distribution system 66 is handled by receiving set components, either analog tuner 1210 or digital tuner/demodulator 1218. Analog tuner 1210 may be any conventional tuner suitable for use in receiving video signals over a cable distribution system or the like. Analog signals on coaxial distribution system 66 having a particular carrier frequency are received by analog tuner 1210 if it is tuned to that frequency. Analog tuner 1210 is coupled to secure processor subsystem 1212. Secure processor subsystem 1212 may be any known system for receiving scrambled or otherwise secured analog signals over a private distribution system. Typically, the secured processor subsystem 1212, its components, and their functionality are compatible with remote terminal 65 (at the head end of the coaxial distribution system 66 and shown in FIG. 1). Secure processor subsystem 1212 includes a conventional analog descrambler 1216 for descrambling signals received and forwarded by analog tuner 1210. Secure processor subsystem 1212 also includes a nonvolatile memory subsystem 1214 for storing information necessary for decoding received transmissions, including normal cable program transmissions, pay-per-view program transmissions and the like.

Digital signals on cable distribution system 66 are received by digital tuner/demodulator 1218 if they are in a band to which the digital tuner/demodulator 1218 is tuned. Digital tuner/demodulator 1218, which can be any suitable conventional component, demodulates signals it is tuned to receive in order to reconstruct the desired digitized analog signal. This resulting signal is transmitted to video decoder 1220, a conventionally available device that interprets the input stream. Video decoder 1220 thereby recovers the compressed signal to produce a video signal.

Analog descrambler 1216 and video decoder 1220 are both coupled to graphics assist module 1222. Graphics assist module 1222 can be any conventionally available graphics processor suitable for adding a graphics overlay onto the video signals received from the video decoder 1220 and/or the analog descrambler 1216 in response to instructions implemented by software running on CPU 1228. The functionality of graphics assist module 1222 could be implemented by CPU 1228 if it were suitably programmed and capable of sufficient throughput. As will be further described below, graphics assist module 1222, in response to instructions received over system bus 1224, generates a video signal overlaid on the existing television signal indicating the availability of an interactive program. For example, graphics assist module 1222 may generate a button image, or a logo or other pattern or symbol, and inject the image into the video stream such that the image appears in a designated portion of the screen. Information used in generating this button, as described below, may be available in the signal received over coaxial distribution system 66, or may use information stored in the STB 100, such as in static memory 1229, in which the button information may be pre-loaded.

The video stream emerging from analog descrambler 1216 or video decoder 1220, and from graphics assist module 1222, is provided to NTSC signal generation module 1226. As an alternative to NTSC, signal generation module 1226 could generate signals according to any available and desired video format. NTSC signal generation module 1226 is conventional circuitry for transforming the output of analog descrambler 1216, video decoder 1220 and graphics assist 1222 into the standard foam usable by a conventional television or monitor (not shown in this view). This functionality could, alternatively, convert input signals to any suitable standard format. As shown in FIG. 8, NTSC signal generation module 1226 generates a set of coordinated signals and provides them on channel 3 or 4, 1226A, to a monitor adapted to receive and display television signals (not shown). Also transmitted by NTSC signal generation module 1226 to the monitor or television (not shown) is a composite/Svideo Out signal, 1226B, and left and right audio signals, 1226C.

In addition to the previously described components and functionality, which have to do with the receipt and provision of television signals, possibly with inserted graphics, STB 100 includes a number of components and implements several additional functions.

The processing associated with managing and controlling the functions of the set top box 100 is performed by CPU 1228. CPU 1228 may be any suitable commercially available processor and preferably one capable of performing in excess of 30 Mips, such as a Power PC or Pentium chip. In running system software stored in static memory 1229 (which may be an EEPROM, ROM or the like), CPU 1228 has access via system bus 1224 to static memory 1229 and to dynamic memory 1230, (which may be conventionally available memory, preferably with a storage capacity of at least about 4-5 MB). CPU 1228 also has access via system bus 1224 to information regarding the current channel, to the graphics assist 1222 regarding screen button or other graphical display signals, and to video decoder 1220 and digital tuner/demodulator 1218, as well as to secure processing subsystem 1212 and analog tuner 1210 in order to assert command messages to those components.

Interaction by subscriber 70 with STB 100 may be by any suitable means, but is preferably by conventional infrared (IR) remote control. IR controller 1232 receives signals from subscriber-controlled remote control input device 1233 via an IR receiver and associated circuitry (not shown). Instructions received by IR controller 1232 may be asserted via system bus 1224 as commands to secure processor subsystem 1212 and analog tuner 1210, as well as to video decoder 1220 and digital tuner demodulator 1218. IR controller 1232 can also send messages to CPU 1228 when, for example, subscriber 70 requests an interactive program or other service.

Interaction by the STB 100 upstream via coaxial distribution system 66 and to video service provider 1 is conducted by CPU 1228 through WAN communications processor 1234. WAN communications processor 1234 can be any conventional device suitable for converting messages received via system bus 1224 into a WAN-compatible protocol, such as IP (internet protocol). Upstream modulator 1236, which can be any conventional device, modulates signals received from WAN communications processor 1234 for transmission over coaxial distribution system 66 and via remote terminal 65 and network provider 10 to interactive server 5 of video services provider 1 (as shown in FIG. 1).

STB Processing Associated with Operation of Several Embodiments of a System According to the Present Disclosure In FIGS. 9-12, the processing associated with four embodiments of the STB 100 according to the present disclosure is shown in the form of diagrams depicting the processing states of the STB 100, conditions for transitioning between those states and processing associated with each state and incident to the state transitions. The embodiment shown in FIG. 9 corresponds to the embodiment of the disclosure shown in FIGS. 2A and B, FIG. 10 corresponds to FIGS. 3A and B, FIG. 11 to FIGS. 4A and B, and FIG. 12 to FIGS. 5A and B. The processor states and processing carried out by STB 100 are implemented by CPU 1228, shown in FIG. 8. As has been described with reference to that figure, CPU 1228 has access via system bus 1224 to signals received over coaxial distribution system 66 that have been descrambled or decoded as necessary by either of video decoder 1220 or analog descrambler 1216. CPU 1228 is easily capable of sampling these sources sufficiently frequently to detect the receipt of new video frames and to detect the presence and content of information in the VBI of received video signals. In alternate embodiments of the present disclosure, the STB 100 could receive and analyze information received via other in-band or out-of-band transmission paths.

The processes shown in these figures could also be represented as logic flow diagrams. Moreover, the exact ordering of the numbered boxes of the flowcharts is not a limitation of the disclosure, but merely an illustration of one way in which the depicted function of each embodiment of this aspect of the present disclosure may be carried out.

Figure 9:
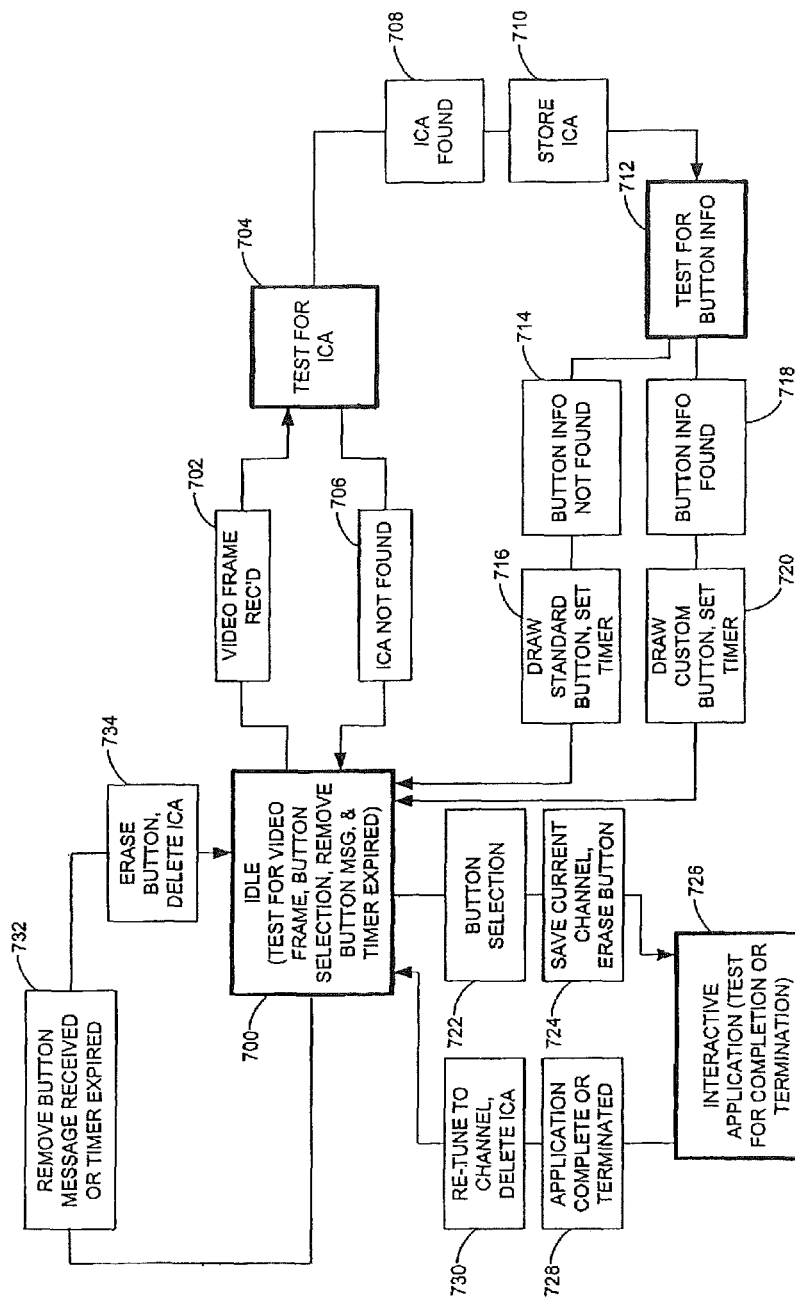
FIG. 9 is a state diagram showing operating states of an embodiment of a set top box according to the present disclosure, corresponding to the embodiment of the system according to the present disclosure shown in FIGS. 2A and 2B, and indicating conditions leading to state transitions and processing associated with the states and performed incident to the state transitions.

STB Processing Where an Application-Specific Interactive Callback Address is Transmitted with Program and Identified by a Standard Button Overlay Processes performed by STB 100 in carrying out the first embodiment the system and method according to the present disclosure are shown in FIG. 9. As shown, the STB 100 process begins when the subscriber 70 turns on the STB 100 to view a program. The STB 100 process at that time initializes into the idle state, 700. While in the idle state 700, the STB 100 checks a number of conditions: it checks whether a video frame has been received; whether a screen button has been selected by viewing subscriber 70; whether a "remove button" message has been received with a video frame; and whether a button timer has exceeded a threshold value and thus expired.

If a video frame has been received, 702, STB 100 enters a new state, 704, in which it tests the video frame, particularly the VBI of that frame, for the presence of an ICA. As described elsewhere in this application, according to the present disclosure, the ICA could alternatively be transmitted to the STB 100 by any suitable in-band or out-of-band means.

If no ICA is detected in the given frame by STB 100 at 706, the process returns to idle state 700. However, if an ICA is detected in the received frame at 708, STB 100 at 710 stores the ICA, for example in dynamic memory 1230 (shown in FIG. 8). STB 100 then enters a new state, 712.

In state 712, STB 100 tests the detected ICA for the presence of information relating to the drawing of a screen button to indicate to viewing subscriber 70 that an interactive program is available. If such information related to the configuration of the screen button is found, at 718, then STB 100 draws a custom button according to this information, at 720. Also at 720, STB 100 sets a timer for the screen button, which STB 100 will check to ensure that the button remains on the screen no longer than a desired maximum time. If the button information was not found in the ICA, 714, then STB 100 at 716 draws a standard button on the basis of information stored in static memory 1229, shown in FIG. 8. STB 100 at 716 also sets the timer to be later checked in order to ensure that the standard screen button is timely erased. After the button is drawn and the timer is set at 716 or 720, idle state 700 is resumed.

When in the idle state 700, in addition to testing whether a video frame has been received, as described above, STB 100 also tests whether a screen button, if present on the screen, has been selected by subscribing viewer 70. STB 100 can access this information available from IR controller 1232 via system bus 1224, as shown in FIG. 8. If a button has been selected, 722, STB 100, at 724, saves in dynamic memory 1230 (shown in FIG. 8) the identity of the channel currently being viewed by subscriber 70. STB 100 at 724 also erases the screen button, which provides feedback to subscriber 70 that the button has been selected.

After the channel has been saved and the button erased at 724, STB 100 enters the interactive application state 726. In interactive application state 726, STB 100 establishes an interactive session with interactive server 5 of video service provider 1 over the network by sending a message containing the ICA using WAN communications processor 1234 and upstream modulator 1236 (shown in FIG. 8 and described above) over coaxial distribution system 66, and via remote terminal 65 and network service provider 10 to interactive server 5 of video service provider 1 (shown in FIG. 1).

STB 100 remains in the interactive application state 726 as long as the interactive application invoked by the ICA and provided by video service provider 1 has not ended or been terminated by subscribing viewer 70 via IR controller 1232. If either of these events are detected by STB 100 at 728, however, STB 100 at 730 retrieves from dynamic memory 1230 the earlier-stored identity of the channel originally being watched and issues a command to either video decoder 1220 and digital tuner/demodulator 1218 or secure processor subsystem 1212 and analog tuner 1210 to re-tune to that original channel. Also at 730, STB 100 deletes the ICA from dynamic memory 1230. STB 100 then returns to the idle state 700.

While in idle state 700, and in addition to testing for the reception of video frames and whether a screen button has been selected, STB 100 also checks, when a video frame has been received at 702, but no ICA has been detected at 706, for a "remove button" message in the VBI of the video frame (or in any other suitable in-band or out-of-band signaling path). STB 100 also periodically checks whether the timer, set at 716 or 720, has expired. If either a "remove button" message has been received or the expiration of the timer has been detected, at 732, then STB 100, at 734, erases the screen button and deletes the ICA from dynamic memory 1230, if one had been previously stored. STB 100 then returns to its idle state 700 and continues checking for video frames, the selection of a screen button, remove button messages and timer expirations.

Figure 10:
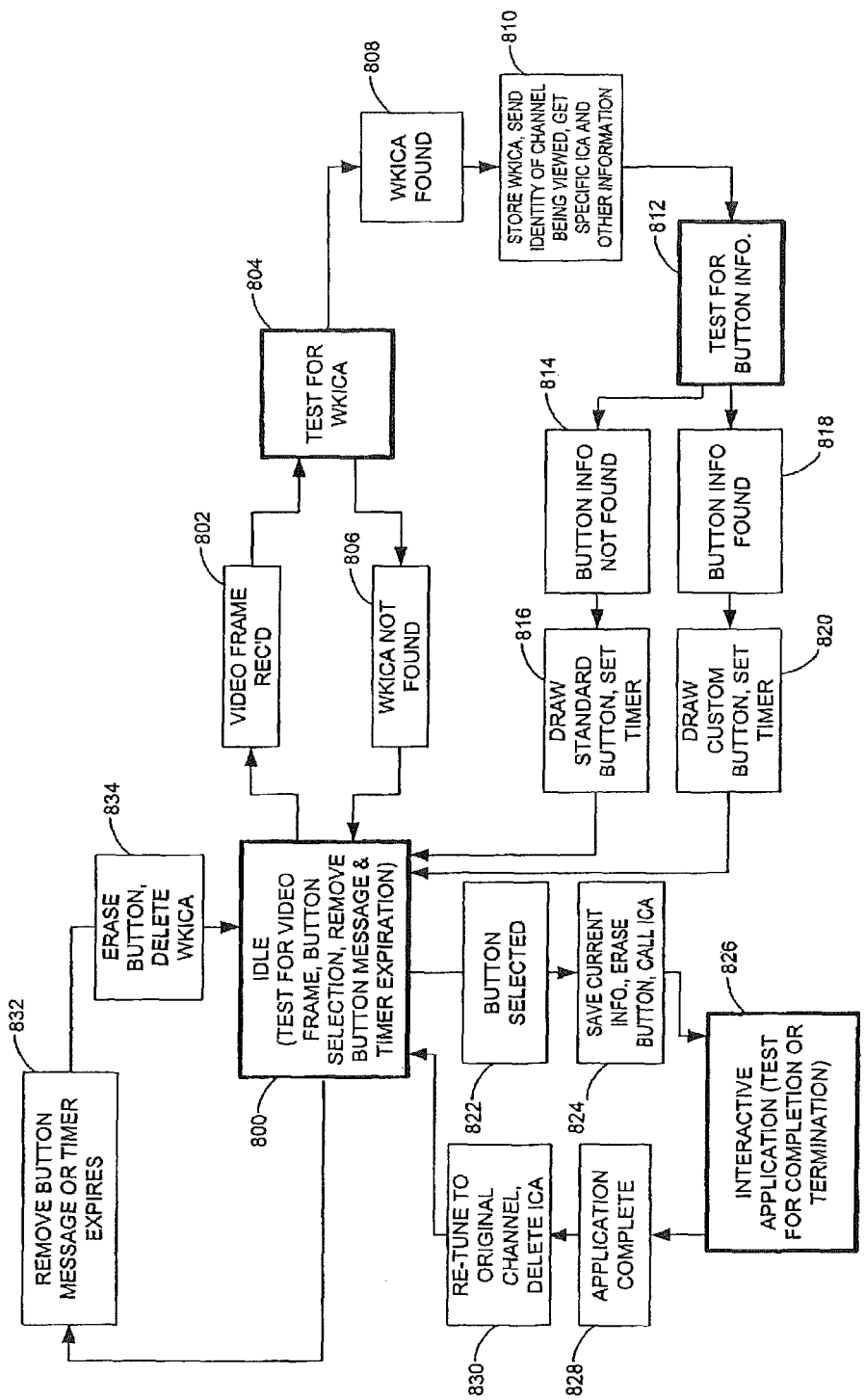
FIG. 10 is a state diagram showing operating states of an embodiment of a set top box according to the present disclosure, corresponding to the embodiment of the system according to the present disclosure shown in FIGS. 3A and 3B, and indicating conditions leading to state transitions and processing associated with the states and performed incident to the transitions.

STB Processing Where a Well-Known Interactive Callback Address is Transmitted With a Program and Identified by Standard Button Overlay In FIG. 10, processes performed by STB 100 in connection with a second embodiment of the system and method according to the present disclosure are shown in state diagram form. The STB 100 process begins when the subscriber 70 turns on the STB 100 to view a program. The STB process initializes into the idle state, 800. While in the idle state 800, the STB 100 checks a number of conditions: it checks whether a video frame has been received; whether a screen button has been selected by viewing subscriber 70; whether a "remove button" message has been received with a video frame; and whether a button timer has exceeded a threshold value and thus expired.

If a video frame has been received, at 802, STB 100 enters a new state, 804. In this state, it tests the video frame, particularly the VBI of that frame, for the presence of a WKICA (i.e., a well-known interactive callback address, described above) associated with the program being viewed. As discussed elsewhere in this application, according to the present disclosure, the WKICA could alternatively be transmitted to the STB 100 by any suitable in-band or out-of-band means.

If STB 100 detects at 806 no WKICA in the given frame, the process returns to state 800. However, if a WKICA is detected in the received frame, at 808, STB 100, at 810, stores the WKICA, for example in dynamic memory 1230 (shown in FIG. 8). STB 100 then calls the WKICA, establishes an interactive session with the WKICA, and sends the WKICA application the identity of the broadcast channel on which it received the WKICA. STB 100 then receives from the WKICA application the specific ICA, which it must call if the associated button on the screen is selected. STB 100 stores the ICA, for example in dynamic memory 1230 (shown in FIG. 8) and then enters a new state, 812.

In state 812, STB 100 tests information downloaded from the WKICA interactive session for the presence of information relating to the drawing of a screen button to indicate to viewing subscriber 70 that an interactive program is available. If such information related to the configuration of the screen button is found, at 818, then STB 100 draws a custom button according to this information, at 820. Also at 820, STB 100 sets a timer for the screen button, which it will check to ensure that the button remains on the screen no longer than a desired maximum time. If the button information was not received from the WKICA interactive session, at 814, then STB 100, at 816, draws a standard button on the basis of information stored in static memory 1229, shown in FIG. 8. STB 100, at 816, also sets the timer to be later checked in order to ensure that the standard screen button is timely erased. After the button is drawn and the timer is set at 816 or 820, idle state 800 is resumed.

When in the idle state 800, in addition to testing whether a video frame has been received, as described above, STB 100 also tests whether a screen button, if present on the screen, has been selected by viewing subscriber 70. STB 100 can access this information, available from IR controller 1232, via system bus 1224, as shown in FIG. 8. If a button selection has been selected, 822, STB 100 at 824 saves in dynamic memory 1230 (shown in FIG. 8) the identity of the channel currently being viewed by subscriber 70. STB 100, at 824, also erases the screen button, thus providing feedback to subscriber 70 that the button has been selected.

After the channel has been saved and the button erased, at 824, STB 100 calls the specific ICA and enters the interactive application state, 826. In interactive application state 826, STB 100 initiates an interactive session with interactive server 5 of video service provider 1 over the network by sending a message containing the ICA using WAN communications processor 1234 and upstream modulator 1236 (shown in FIG. 8 and described above) over coaxial distribution system 66, and via remote terminal 65 and network service provider 10 to interactive server 5 of video service provider 1 (shown in FIG. 1).

STB 100 remains in the interactive application state 826 as long as the interactive application invoked by the ICA and provided by video service provider 1 has not ended or been terminated by subscribing viewer 70 via IR controller 1232. If either of these events are detected by STB 100, at 828, at 830 it retrieves from dynamic memory 1230 the earlier-stored identity of the channel originally being watched and issues a command to either video decoder 1220 and digital tuner/demodulator 1218 or secure processor subsystem 1212 and analog tuner 1210 to re-tune to that original channel. Also at 830, STB 100 deletes the ICA from dynamic memory 1230. STB 100 then returns to the idle state 800.

In addition to testing in idle state 800 for the reception of video frames and whether a screen button has been selected, STB 100 also conducts a further check. If, at 802, a video frame has been received, but no WKICA has been detected at 806, STB 100 checks for a "remove button" message in the VBI of the video frame (or in any other suitable in-band or out-of-band signaling path). STB 100 also periodically checks whether the timer, set at 816 or 820, has expired. If either a "remove button" message has been received or the expiration of the timer has been detected, at 832, then STB 100, at 834, erases the screen button and deletes the ICA from dynamic memory 1230, if one had been previously stored. STB 100 then returns to its idle state 800 and continues checking for video frames, the selection of a screen button, remove button messages and timer expirations.

Figure 11:
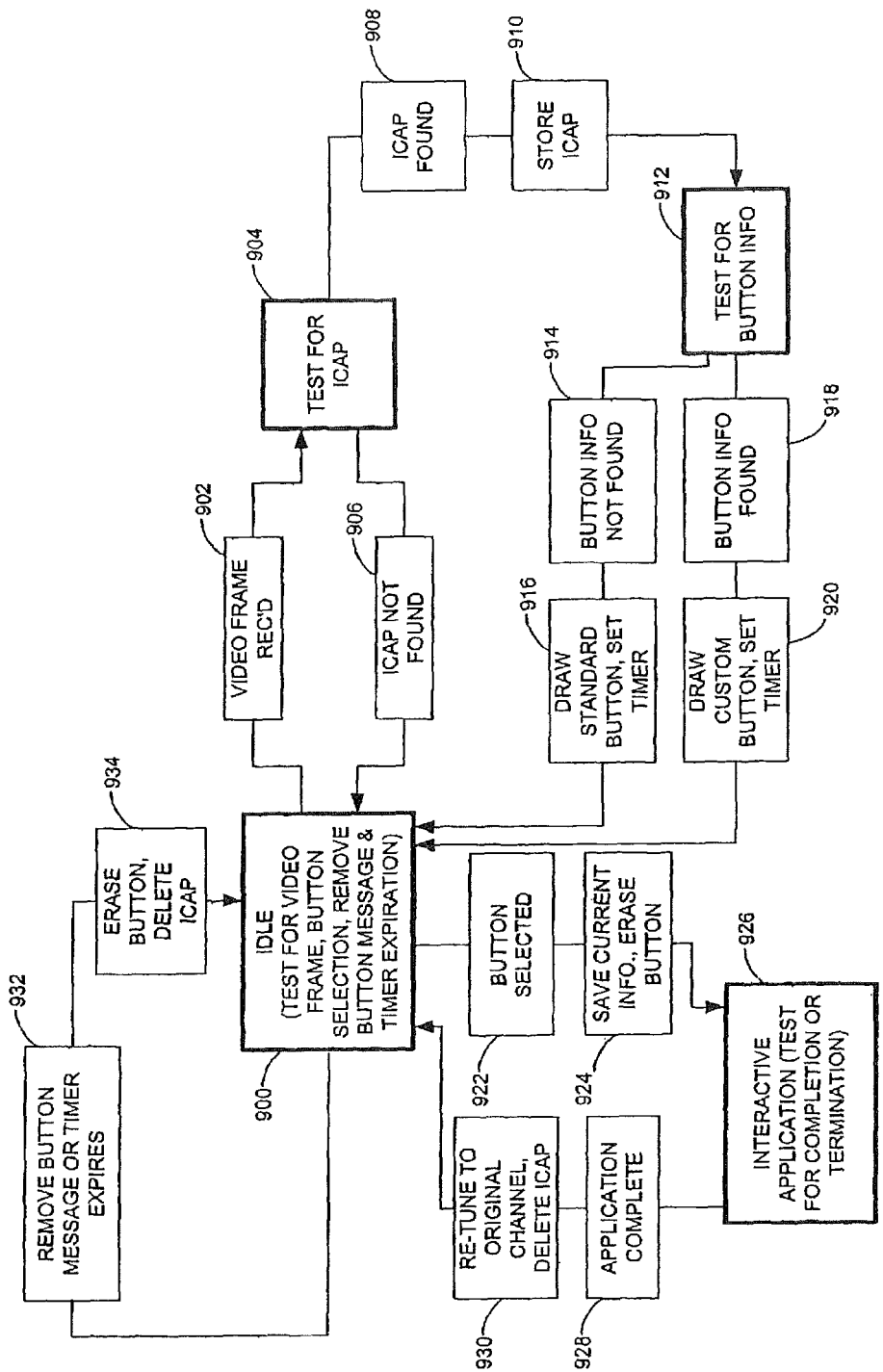
FIG. 11 is a state diagram showing operating states of an embodiment of a set top box according to the present disclosure, corresponding to the embodiment of the system according to the present disclosure shown in FIGS. 4A and 4B, and indicating conditions leading to state transitions and processing associated with the states and performed incident to the transitions.

STB Processing Where an Application-Specific Interactive Callback Address Package is Transmitted with Program and Identified by a Non-Standard Button Overlay A third embodiment of the processing performed by STB 100 in implementing the system and method according to the present disclosure is shown in FIG. 11. The STB 100 process begins when the subscriber 70 turns on the STB 100 to view a program. The STB 100 process initializes into the idle state, 900. While in the idle state, 900, the STB 100 checks a number of conditions: it checks whether a video frame has been received; whether a screen button has been selected by viewing subscriber 70; whether a "remove button" message has been received with a video frame; and whether a button timer has exceeded a threshold value and thus expired.

If a video frame has been received, at 902, STB 100 enters a new state, 904, in which it tests the video frame, particularly the VBI of that frame, for the presence of an ICAP associated with the program being viewed. As described above in connection with FIGS. 4A and 4B, an ICAP is an interactive callback address package, described above as optionally including non-standard or customized button information such as: a) type(s) of buttons; b) description of buttons; c) location of button(s) on screen; d) text of button(s); and e) other characteristics of buttons. As discussed elsewhere in this application, according to the present disclosure, the ICAP could alternatively be transmitted to the STB 100 by any suitable in-band or out-of-band means.

If STB 100, at 906, detects no ICAP in the given frame, the process returns to state 900. However, if an ICAP is detected in the received frame, at 908, STB 100 at 910 stores the ICAP, for example in dynamic memory 1230 (shown in FIG. 8). STB 100 then enters a new state, 912.

At 912, STB 100 tests the detected ICAP for the presence of custom information relating to the drawing of a screen button to indicate to viewing subscriber 70 that an interactive program is available. If such information related to the configuration of the screen button is found, at 918, then STB 100 draws a custom button according to this information, at 920. Also at 920, STB 100 sets a timer for the screen button, which it will check in order to ensure that the button remains on the screen no longer than a desired maximum time. If the button information was not found in the ICAP, at 914, then STB 100, at 916, draws a standard button on the basis of information stored in static memory 1229, shown in FIG. 11. STB 100, at 916, also sets the timer to be later checked in order to ensure that the standard screen button is timely erased. After the button is drawn and the timer is set at 916 or 920, idle state 900 is resumed.

When in the idle state 900, in addition to testing whether a video frame has been received, as described above, STB 100 also tests whether a screen button, if present on the screen, has been selected by subscribing viewer 70. STB 100 can access this information, available from IR controller 1232, via system bus 1224, as shown in FIG. 8. If a button has been selected, 922, STB 100 at 924 saves in dynamic memory 1230 (shown in FIG. 8) the identity of the channel currently being viewed by subscriber 70. STB 100, at 924, also erases the screen button, thus providing feedback to subscriber 70 that the button has been selected.

After the channel has been saved and the button erased, at 924, STB 100 enters the interactive application state, 926. In interactive application state 926, STB 100 establishes an interactive session with interactive server 5 of video service provider 1 over the network by sending a message containing the ICAP using WAN communications processor 1234 and upstream modulator 1236 (shown in FIG. 8 and described above) over coaxial distribution system 66, and via remote terminal 65 and network service provider 10 to interactive server 5 of video service provider 1 (shown in FIG. 1).

STB 100 remains in the interactive application state, 926, as long as the interactive application invoked by the ICAP and provided by video service provider 1 has not ended or been terminated by subscribing viewer 70 using IR controller 1232. If either of these events are detected by STB 100, at 928, STB 100, at 930, retrieves from dynamic memory 1230 the earlier-stored identity of the channel originally being watched and issues a command to either video decoder 1220 and digital tuner/demodulator 1218, or to secure processor subsystem 1212 and analog tuner 1210 to retune to that original channel. Also at 930, STB 100 deletes the ICAP from dynamic memory 1230. STB 100 then returns to the idle state 900.

In addition to testing in idle state 900 for the reception of video frames and whether a screen button has been selected, STB 100 also conducts a further check. If, at 902, a video frame has been received but no ICAP has been detected, at 906, STB 100 checks for a "remove button" message in the VBI of the video frame (or in any other suitable in-band or out-of-band signaling path). STB 100 also periodically checks whether the timer, set at 916 or 920, has expired. If either a "remove button" message has been received or the expiration of the timer has been detected at 932, then STB 100 at 934 erases the screen button and deletes the ICAP from dynamic memory 1230, if one had been previously stored.

STB 100 then returns to its idle state 900 and continues checking for video frames, the selection of a screen button, remove button messages and timer expirations.

Figure 12:
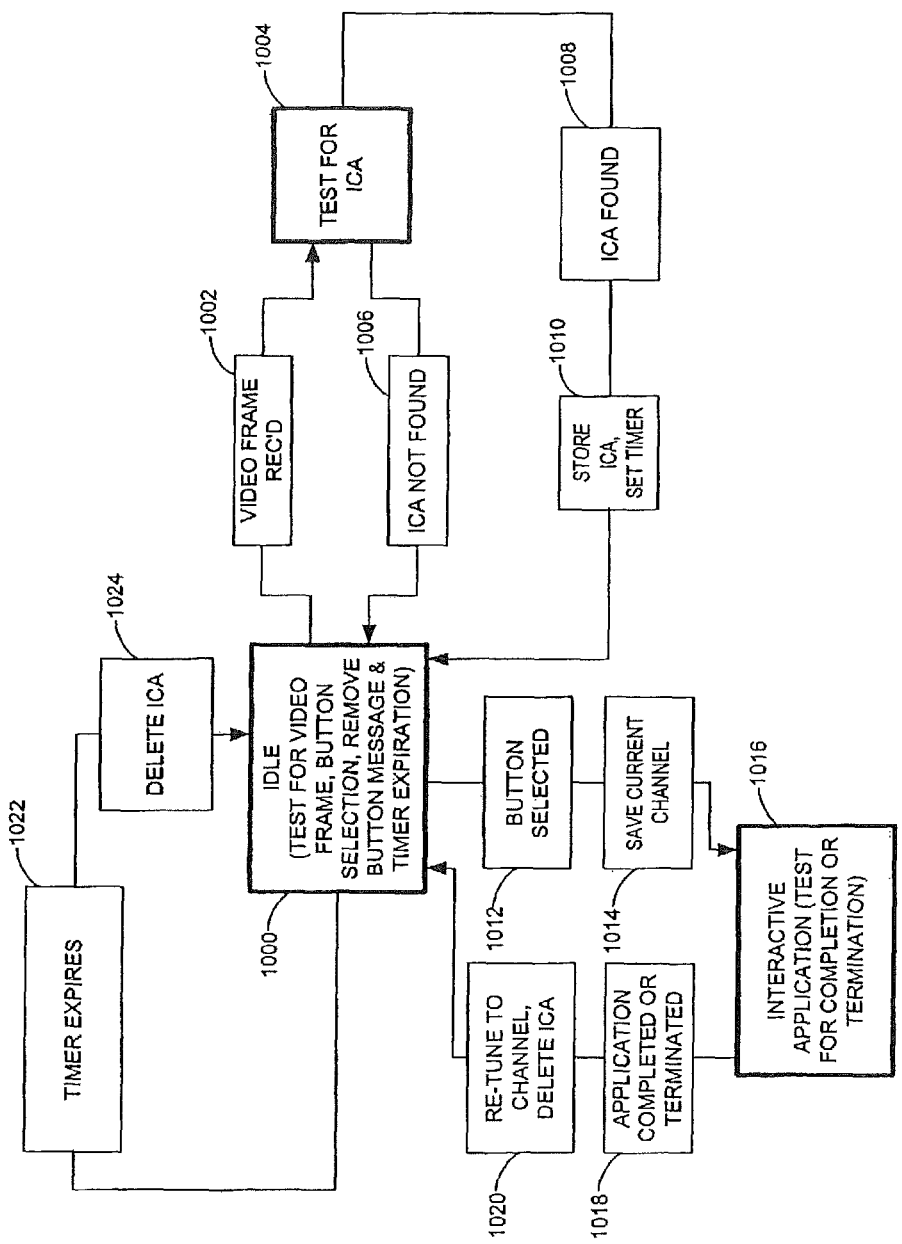
FIG. 12 is a state diagram showing operating states of an embodiment of a set top box according to the present disclosure, corresponding to the embodiment of the system according to the present disclosure shown in FIGS. 4A and 4B, and indicating conditions leading to state transitions and processing associated with the states and performed incident to the transitions.

STB Processing Where an Application-Specific Interactive Callback Address and Button Overlay are Both Transmitted with the Program Referring to FIG. 12, processing by STB 100 in connection with the fourth embodiment of the system and method according to the present disclosure is shown. In this embodiment, the button indicating the availability of an interactive program is inserted into the signal at its point of origin and thus need not be overlaid by STB 100.

The STB 100 process begins when the subscriber 70 turns on the STB 100 to view a program. The STB 100 process initializes into the idle state, 1000. While in the idle state, 1000, the STB 100 checks a number of conditions: it checks whether a video frame has been received; whether a screen button has been selected by viewing subscriber 70; and whether a timer has expired by exceeding a threshold value.

If a video frame has been received, 1002, STB 100 enters a new state, 1004, in which it tests the video frame, particularly the VBI of that frame, for the presence of an ICA associated with the program being reviewed. As discussed elsewhere in this application, according to the present disclosure, the ICA could alternatively be transmitted to the STB 100 by any suitable in-band or out-of-band means.

If STB 100 detects, at 1006, no ICA in the given frame, the process returns to the idle state, 1000. However, if an ICA is detected in the received frame, 1008, STB 100, at 1010, stores the ICA, for example in dynamic memory 1230 (shown in FIG. 8). STB 100, also at 1010, sets the timer. The STB 100 then returns to the idle state, 1000. No button needs to be drawn, since a button will be present, if at all, in the received broadcast signal and thus on the screen.

When in the idle state, 1000, in addition to testing whether a video frame has been received, as described above, STB 100 also tests whether a screen button, if present on the screen, has been selected by subscribing viewer 70. STB 100 can access this information, available from IR controller 1232, via system bus 1224, as shown in FIG. 8. If a button has been selected, at 1012, STB 100, at 1014, saves in dynamic memory 1230 (shown in FIG. 8) the identity of the channel currently being viewed by subscriber 70. STB 100, at 1014, need not erase the screen button, since it was not responsible for overlaying the button. Rather, at the desired time, the button is removed at the point of origin, where it was inserted into the video stream.

After the channel has been saved at 1014, STB 100 enters the interactive application state, 1016. In the interactive application state, 1016, STB 100 establishes an interactive session with interactive server 5 of video service provider 1 over the network by sending a message containing the ICA. STB 100 sends the message containing the ICA using WAN communications processor 1234 and upstream modulator 1236 (shown in FIG. 8 and described above) over coaxial distribution system 66, and via remote terminal 65 and network service provider 10 to interactive server 5 of video service provider 1 (shown in FIG. 1).

STB 100 remains in the interactive application state 1016 as long as the interactive application invoked by the ICA and provided by video service provider 1 has not ended or been terminated by subscribing viewer 70 using IR controller 1232. If either of these events are detected by STB 100, at 1018, however, STB 100 at 1020 retrieves from dynamic memory 1230 the earlier-stored identity of the channel originally being watched. STB 100 then also issues a command to either video decoder 1220 and digital tuner/demodulator 1218, or to secure processor subsystem 1212 and analog tuner 1210, to re-tune to the original channel. Also at 1020, STB 100 deletes the ICA from dynamic memory 1230. STB 100 then returns to the idle state 1000.

In addition to testing in idle state 1000 for the reception of video frames and whether a screen button has been selected, STB 100 also conducts a further check. If at 1002 a video frame has been received but no ICA has been detected at 1006, STB 100 checks periodically whether the timer, set at 1010, has expired. If either the screen button has been removed from the broadcast image at its source or the expiration of the timer has been detected at 1022, then STB 100 at 1024 deletes the ICA from dynamic memory 1230, if one had been previously stored. STB 100 then returns to its idle state 1000 and continues checking for video frames, the selection of a screen button, remove button messages and timer expirations.

Signaling Between the Set Top Box and the Interactive Server Associated with Establishing an Interactive Session When a subscriber 70 has seen an icon or button on the screen during a particular program, and wishes to view the interactive application, he or she "pushes the button" by sending the appropriate signal to the STB 100 using a suitable user input device, such as IR remote input device 1233. The signal may be any preselected signal the input device is capable of generating, and the STB 100 is capable of receiving. It could, for example, be one or more existing keys on the IR remote input device 1233. When the STB 100 receives this preselected signal while in state 712, 812, 912 or 1012, depending on the embodiment (in which state STB 100 tests for the selection of a button by viewing subscriber 70, as described), the STB 100 saves the present channel number in dynamic memory 1230, initiates an application for setting up an interactive session, including sending a session request message to the network service provider 10. As defined above, the L1 service, or video dial tone, provided by network service provider 10 represents the data communications phase of a system for providing video services and is the part of that system that is regulated by the FCC. As described above in connection with FIG. 1, the network service provider 10 operates the following components: the switch 12, the network controller 16, the signal processing equipment 14, and the RF equipment 25, and interfaces with the distribution network 50.

The network service provider 10 at the request of STB 100, is responsible for establishing a session between STB 100 and the interactive server 5. If a connection with the interactive server 5 is properly established by the network service provider 10 and the interactive server 5 is up and capable of conducting an interactive session, the interactive server 5 sends a session accept message back to the network service provider 10, which in turn sends a session accept message to the STB 100.

Once the STB 100 has received the session accept message from the interactive server 5 by way of the network service provider 10, it uses the ICA to send an application ID request message directly via the network service provider 10 (i.e., the network service provider 10 service needs only to transmit but not process the message) indicating the application server 5 with which the session is requested. The network service provider 10 sets up an interactive session with the indicated interactive server 5 and sends a confirmation to the STB 100. When it has received this confirmation the STB 100 issues a request to the network service provider 10 to connect with the interactive serve 5. The network service provider 10 then notifies the interactive server 5 of the request. If the interactive server 5 is able to respond to the request, the network service provider 10 establishes a connection between the interactive service 5 and the STB 100, and the interactive session proceeds.

The foregoing describes a preferred embodiment of the present disclosure. Various changes and modifications to what is disclosed may be adopted or implemented without departing from the scope of the disclosure.

What is claimed is:

1. A method comprising:
    receiving an indicator from a service provider via a network, wherein the indicator is received with first media content, and wherein the indicator includes data to cause a selectable image to be displayed with the first media content, the selectable image indicating an availability of second media content that is different than the first media content;
    in response to receipt of the indicator, displaying the selectable image with the first media content at a display device; and
    in response to receiving a message indicating removal of the selectable image before receiving an input indicating a selection of the selectable image, removing the selectable image from display with the first media content.

2. The method of claim 1, wherein the first media content includes video content associated with a broadcast program and the second media content includes interactive content related to a subject matter of the first media content.

3. The method of claim 1, wherein the first media content includes video content associated with a commercial and the second media content includes interactive content related to a subject matter of the first media content.

4. The method of claim 3, wherein the interactive content includes video content, advertising content, audio content, or a combination thereof.

5. The method of claim 1, further comprising, in response to receiving the input indicating the selection of the selectable image before receiving the message indicating removal of the selectable image:
    sending information to a content server, the information indicating the selection of the selectable image; and
    in response to sending the information to the content server, receiving the second media content from the content server.

6. The method of claim 1, wherein the first media content includes video data, voice data, or both.

7. The method of claim 1, wherein the service provider provides video services, cable services, voice services, or a combination thereof.

8. The method of claim 1, wherein the message is received in a portion of a transmission of the first media content.

9. A system comprising:
    a processor; and
    a memory accessible to the processor, the memory including instructions executable by the processor to perform operations comprising:
        receiving an indicator from a service provider system via a network, wherein the indicator is received with first media content, and wherein the indicator includes data to cause a selectable image to be displayed with the first media content, the selectable image indicating an availability of second media content, and the second media content different than the first media content;
        in response to receipt of the indicator, displaying the selectable image with the first media content at a display device; and
        in response to receiving a message indicating removal of the selectable image before receiving an input indicating selection of the selectable image, removing the selectable image from display with the first media content.

10. The system of claim 9, wherein the processor and the memory are included in a media device.

11. The system of claim 9, wherein the operations further comprise determining whether the input indicating selection of the selectable image is received within a time period.

12. The system of claim 11, wherein the time period is indicated in the indicator.

13. The system of claim 9, wherein the indicator includes display information indicating a display characteristic of the selectable image.

14. The system of claim 9, wherein the indicator includes display information indicating a description to be displayed with the selectable image.

15. The system of claim 9, wherein the selectable image is displayed as an overlay on the first media content.

16. The system of claim 9, wherein the operations further comprise displaying a second selectable image with the first media content at the display device, wherein the indicator includes display information indicating the second selectable image, and wherein a selection of the second selectable image causes the selectable image to be removed.

17. The system of claim 9, wherein the indicator includes a network address of a server that provides the second media content.

18. The system of claim 17, wherein the server is distinct from a computing device of the service provider that provides the indicator and the first media content.

19. A system comprising:
    a processor; and
    a memory accessible to the processor, the memory including instructions executable by the processor to perform operations comprising:
        sending an indicator to a media playback device via a service provider network, wherein the indicator is sent with first media content, wherein the indicator includes data to cause the media playback device to display a selectable image with the first media content, and wherein the selectable image indicates an availability of second media content, the second media content different than the first media content; and
        before receiving an input indicating selection of the selectable image, sending a message to the media playback device, the message indicating removal of the selectable image from display with the first media content, wherein the selectable image is removed from display with the first media content in response to receipt of the message.

20. The system of claim 19, wherein the processor and the memory are included in a server of the service provider.

* * * * *